(12) United States Patent
Starke et al.

(10) Patent No.: US 11,995,754 B2
(45) Date of Patent: *May 28, 2024

(54) ENHANCED ANIMATION GENERATION BASED ON MOTION MATCHING USING LOCAL BONE PHASES

(71) Applicant: Electronic Arts Inc., Redwood City, CA (US)

(72) Inventors: Wolfram Sebastian Starke, Edinburgh (GB); Yiwei Zhao, Sunnyvale, CA (US); Mohsen Sardari, Redwood City, CA (US); Harold Henry Chaput, Castro Valley, CA (US); Navid Aghdaie, San Jose, CA (US)

(73) Assignee: Electronic Arts Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/158,422

(22) Filed: Jan. 23, 2023

(65) Prior Publication Data

US 2023/0237724 A1 Jul. 27, 2023

Related U.S. Application Data

(63) Continuation of application No. 17/392,123, filed on Aug. 2, 2021, now Pat. No. 11,562,523.

(51) Int. Cl.
*G06T 13/40* (2011.01)
*G06T 7/215* (2017.01)
(Continued)

(52) U.S. Cl.
CPC .............. *G06T 13/40* (2013.01); *G06T 7/215* (2017.01); *G06T 7/223* (2017.01); *G06V 40/103* (2022.01)

(58) Field of Classification Search
CPC .. G06F 3/04815; G06F 11/3664; G06F 3/011; G06F 11/3688; G06F 8/71;
(Continued)

(56) References Cited

U.S. PATENT DOCUMENTS 5,274,801 A 12/1993 Gordon
5,548,798 A 8/1996 King
(Continued)

FOREIGN PATENT DOCUMENTS

CN 102509272 A 6/2012
CN 103546736 A 1/2014
(Continued)

OTHER PUBLICATIONS

Anagnostopoulos et al., "Intelligent modification for the daltonization process", International Conference on Computer Vision Published in 2007 by Applied Computer Science Group of digitized paintings.
(Continued)

*Primary Examiner* — Ming Wu
(74) *Attorney, Agent, or Firm* — Knobbe, Martens, Olson & Bear, LLP

(57) ABSTRACT

Systems and methods are provided for enhanced animation generation based on using motion mapping with local bone phases. An example method includes accessing first animation control information generated for a first frame of an electronic game including local bone phases representing phase information associated with contacts of a plurality of rigid bodies of an in-game character with an in-game environment. Executing a local motion matching process for each of the plurality of local bone phases and generating a second pose of the character model based on the plurality of matched local poses for a second frame of the electronic game.

18 Claims, 8 Drawing Sheets

(51) Int. Cl.
*G06T 7/223* (2017.01)
*G06V 40/10* (2022.01)

(58) Field of Classification Search
CPC ...... G06F 18/214; G06F 3/0482; G06F 16/29;
G06F 16/9535; G06F 3/048; G06F
3/0484; G06F 11/3684; G06F 16/9024;
G06F 18/217; G06F 3/167; G06F 11/366;
G06F 11/3672; G06F 11/3692; G06F
11/3696; G06F 16/24578; G06F 16/27;
G06F 18/2321; G06F 21/00; G06F
2201/81; G06F 2201/865; G06F 3/04812;
G06F 30/20; G06F 8/34; G06F 9/541;
G06F 11/0751; G06F 11/0754; G06F
11/0778; G06F 11/3409; G06F 11/3438;
G06F 11/3447; G06F 11/3476
See application file for complete search history.

(56) References Cited

U.S. PATENT DOCUMENTS

| | | |
|---|---|---|
| 5,982,389 A | 11/1999 | Guenter et al. |
| 5,999,195 A | 12/1999 | Santangeli |
| 6,064,808 A | 5/2000 | Kapur et al. |
| 6,088,040 A | 7/2000 | Oda et al. |
| 6,253,193 B1 | 6/2001 | Ginter et al. |
| 6,556,196 B1 | 4/2003 | Blanz et al. |
| 6,961,060 B1 | 11/2005 | Mochizuki et al. |
| 7,006,090 B2 | 2/2006 | Mittring |
| 7,403,202 B1 | 7/2008 | Nash |
| 7,415,152 B2 | 8/2008 | Jiang et al. |
| 7,944,449 B2 | 5/2011 | Petrovic et al. |
| 8,100,770 B2 | 1/2012 | Yamazaki et al. |
| 8,142,282 B2 | 3/2012 | Canessa et al. |
| 8,154,544 B1 | 4/2012 | Cameron et al. |
| 8,207,971 B1 | 6/2012 | Koperwas et al. |
| 8,267,764 B1 | 9/2012 | Aoki et al. |
| 8,281,281 B1 | 10/2012 | Smyrl et al. |
| 8,395,626 B2 | 3/2013 | Millman |
| 8,398,476 B1 | 3/2013 | Sidhu et al. |
| 8,406,528 B1 | 3/2013 | Hatwich |
| 8,540,560 B2 | 9/2013 | Crowley et al. |
| 8,599,206 B2 | 12/2013 | Hodgins et al. |
| 8,624,904 B1 | 1/2014 | Koperwas et al. |
| 8,648,863 B1 | 2/2014 | Anderson et al. |
| 8,860,732 B2 | 10/2014 | Popovic et al. |
| 8,914,251 B2 | 12/2014 | Ohta |
| 9,117,134 B1 | 8/2015 | Geiss et al. |
| 9,256,973 B2 | 2/2016 | Koperwas et al. |
| 9,317,954 B2 | 4/2016 | Li et al. |
| 9,483,860 B2 | 11/2016 | Hwang et al. |
| 9,616,329 B2 | 4/2017 | Szufnara et al. |
| 9,652,879 B2 | 5/2017 | Aguado |
| 9,741,146 B1 | 8/2017 | Nishimura |
| 9,811,716 B2 | 11/2017 | Kim et al. |
| 9,826,898 B1 | 11/2017 | Jin et al. |
| 9,858,700 B2 | 1/2018 | Rose et al. |
| 9,861,898 B2 | 1/2018 | Miura et al. |
| 9,947,123 B1 | 4/2018 | Green |
| 9,984,658 B2 | 5/2018 | Bonnier et al. |
| 9,990,754 B1 | 6/2018 | Waterson et al. |
| 10,022,628 B1 | 7/2018 | Matsumiya et al. |
| 10,096,133 B1 | 10/2018 | Andreev |
| 10,118,097 B2 | 11/2018 | Stevens |
| 10,198,845 B1 | 2/2019 | Bhat et al. |
| 10,314,477 B1 | 6/2019 | Goodsitt et al. |
| 10,388,053 B1 | 8/2019 | Carter, Jr. et al. |
| 10,403,018 B1 | 9/2019 | Worsham |
| 10,440,443 B2 * | 10/2019 | Casey ............... H04N 21/23406 |
| 10,535,174 B1 | 1/2020 | Rigiroli et al. |
| 10,726,611 B1 | 7/2020 | Court |
| 10,733,765 B2 | 8/2020 | Andreev |
| 10,755,466 B2 | 8/2020 | Chamdani et al. |
| 10,792,566 B1 | 10/2020 | Schmid |
| 10,825,220 B1 | 11/2020 | Chang et al. |
| 10,856,733 B2 | 12/2020 | Anderson et al. |
| 10,860,838 B1 | 12/2020 | Elahie et al. |
| 10,878,540 B1 | 12/2020 | Stevens |
| 10,902,618 B2 | 1/2021 | Payne et al. |
| 10,986,400 B2 | 4/2021 | Hua et al. |
| 11,017,560 B1 | 5/2021 | Gafni et al. |
| 11,403,513 B2 | 8/2022 | Hasenclever et al. |
| 11,562,523 B1 | 1/2023 | Starke et al. |
| 11,670,030 B2 | 6/2023 | Shi et al. |
| 2002/0054054 A1 | 5/2002 | Sanbe |
| 2002/0089504 A1 | 7/2002 | Merrick et al. |
| 2002/0180739 A1 | 12/2002 | Reynolds et al. |
| 2003/0038818 A1 | 2/2003 | Tidwell |
| 2004/0027352 A1 | 2/2004 | Minakuchi |
| 2004/0227760 A1 | 11/2004 | Anderson et al. |
| 2004/0227761 A1 | 11/2004 | Anderson et al. |
| 2005/0237550 A1 | 10/2005 | Hu |
| 2006/0036514 A1 | 2/2006 | Steelberg et al. |
| 2006/0149516 A1 | 7/2006 | Bond et al. |
| 2006/0217945 A1 | 9/2006 | Leprevost |
| 2006/0262114 A1 | 11/2006 | Leprevost |
| 2007/0085851 A1 | 4/2007 | Muller et al. |
| 2007/0097125 A1 | 5/2007 | Xie et al. |
| 2008/0049015 A1 | 2/2008 | Elmieh et al. |
| 2008/0111831 A1 | 5/2008 | Son et al. |
| 2008/0152218 A1 | 6/2008 | Okada |
| 2008/0268961 A1 | 10/2008 | Brook |
| 2008/0273039 A1 | 11/2008 | Girard |
| 2008/0316202 A1 | 12/2008 | Zhou et al. |
| 2009/0066700 A1 | 3/2009 | Harding et al. |
| 2009/0195544 A1 | 8/2009 | Wrinch et al. |
| 2009/0315839 A1 | 12/2009 | Wilson et al. |
| 2010/0134501 A1 | 6/2010 | Lowe et al. |
| 2010/0251185 A1 | 9/2010 | Pattenden |
| 2010/0277497 A1 | 11/2010 | Dong et al. |
| 2011/0012903 A1 | 1/2011 | Girard |
| 2011/0074807 A1 | 3/2011 | Inada et al. |
| 2011/0086702 A1 | 4/2011 | Borst et al. |
| 2011/0119332 A1 | 5/2011 | Marshall et al. |
| 2011/0128292 A1 | 6/2011 | Ghyme et al. |
| 2011/0164831 A1 | 7/2011 | Van Reeth et al. |
| 2011/0187731 A1 | 8/2011 | Tsuchida |
| 2011/0269540 A1 | 11/2011 | Gillo et al. |
| 2011/0292055 A1 | 12/2011 | Hodgins et al. |
| 2012/0083330 A1 | 4/2012 | Ocko |
| 2012/0115580 A1 | 5/2012 | Hornik et al. |
| 2012/0220376 A1 | 8/2012 | Takayama et al. |
| 2012/0244941 A1 | 9/2012 | Ostergren et al. |
| 2012/0275521 A1 | 11/2012 | Cui et al. |
| 2012/0303343 A1 | 11/2012 | Sugiyama et al. |
| 2012/0313931 A1 | 12/2012 | Matsuike et al. |
| 2013/0050464 A1 | 2/2013 | Kang |
| 2013/0063555 A1 | 3/2013 | Matsumoto et al. |
| 2013/0120439 A1 | 5/2013 | Harris et al. |
| 2013/0121618 A1 | 5/2013 | Yadav |
| 2013/0222433 A1 | 8/2013 | Chapman et al. |
| 2013/0235045 A1 | 9/2013 | Corazza et al. |
| 2013/0263027 A1 | 10/2013 | Petschnigg et al. |
| 2013/0311885 A1 | 11/2013 | Wang et al. |
| 2014/0002463 A1 | 1/2014 | Kautzman et al. |
| 2014/0198106 A1 | 7/2014 | Sumner et al. |
| 2014/0198107 A1 | 7/2014 | Thomaszewski et al. |
| 2014/0285513 A1 | 9/2014 | Aguado |
| 2014/0327694 A1 | 11/2014 | Cao et al. |
| 2015/0113370 A1 | 4/2015 | Flider |
| 2015/0126277 A1 | 5/2015 | Aoyagi |
| 2015/0187113 A1 | 7/2015 | Rubin et al. |
| 2015/0235351 A1 | 8/2015 | Mirbach et al. |
| 2015/0243326 A1 | 8/2015 | Pacurariu et al. |
| 2015/0381925 A1 | 12/2015 | Varanasi et al. |
| 2016/0026926 A1 | 1/2016 | Yeung et al. |
| 2016/0042548 A1 | 2/2016 | Du et al. |
| 2016/0071470 A1 | 3/2016 | Kim et al. |
| 2016/0217723 A1 | 7/2016 | Kim et al. |
| 2016/0307369 A1 | 10/2016 | Freedman et al. |
| 2016/0314617 A1 | 10/2016 | Forster et al. |
| 2016/0354693 A1 | 12/2016 | Yan et al. |
| 2017/0132827 A1 | 5/2017 | Tena et al. |

(56) References Cited

U.S. PATENT DOCUMENTS

| | | | |
|---|---|---|---|
| 2017/0301310 | A1 | 10/2017 | Bonnier et al. |
| 2017/0301316 | A1 | 10/2017 | Farell |
| 2018/0122125 | A1 | 5/2018 | Brewster |
| 2018/0165864 | A1 | 6/2018 | Jin et al. |
| 2018/0211102 | A1 | 7/2018 | Alsmadi |
| 2018/0239526 | A1 | 8/2018 | Varanasi et al. |
| 2018/0293736 | A1 | 10/2018 | Rahimi et al. |
| 2019/0073826 | A1 | 3/2019 | Bailey et al. |
| 2019/0147224 | A1* | 5/2019 | Li .................. G06T 15/205 382/103 |
| 2019/0228316 | A1 | 7/2019 | Felsen et al. |
| 2019/0295305 | A1 | 9/2019 | Yang et al. |
| 2019/0392587 | A1 | 12/2019 | Nowozin et al. |
| 2020/0058148 | A1 | 2/2020 | Blaylock et al. |
| 2020/0294299 | A1 | 9/2020 | Rigiroli et al. |
| 2020/0353311 | A1 | 11/2020 | Ganguly et al. |
| 2020/0388065 | A1 | 12/2020 | Miller, IV et al. |
| 2021/0019916 | A1 | 1/2021 | Andreev |
| 2021/0166459 | A1 | 6/2021 | Miller, IV |
| 2021/0217184 | A1 | 7/2021 | Payne et al. |
| 2021/0220739 | A1 | 7/2021 | Zinno et al. |
| 2021/0292824 | A1* | 9/2021 | Zhang .................. C12N 9/78 |
| 2021/0335004 | A1 | 10/2021 | Zohar et al. |
| 2021/0375021 | A1 | 12/2021 | Starke et al. |
| 2021/0383585 | A1 | 12/2021 | Zhao et al. |
| 2021/0406765 | A1 | 12/2021 | Zhang et al. |
| 2022/0215232 | A1 | 7/2022 | Pardeshi et al. |
| 2022/0230376 | A1 | 7/2022 | Rozantsev et al. |
| 2022/0254157 | A1 | 8/2022 | Fu et al. |
| 2023/0010480 | A1 | 1/2023 | Li et al. |
| 2023/0177755 | A1 | 6/2023 | Starke et al. |
| 2023/0186543 | A1 | 6/2023 | Starke et al. |
| 2023/0267668 | A1 | 8/2023 | Starke et al. |

FOREIGN PATENT DOCUMENTS

| | | | | |
|---|---|---|---|---|
| CN | 105405380 | A | | 3/2016 |
| CN | 105825778 | A | | 8/2016 |
| CN | 110039546 | A | * | 7/2019 |
| CN | 110039546 | A | | 7/2019 |
| JP | 2018-520820 | A | | 8/2018 |
| JP | 2019-162400 | A | | 9/2019 |
| WO | WO 2019/184633 | A1 | | 10/2019 |
| WO | WO-2019184633 | A1 | * | 10/2019 ............. G06F 3/011 |

OTHER PUBLICATIONS

Andersson, S., Goransson, J.: Virtual Texturing with WebGL. Master's thesis, Chalmers University of Technology, Gothenburg, Sweden (2012).

Avenali, Adam, "Color Vision Deficiency and Video Games", The Savannah College of Art and Design, Mar. 2013.

Badlani et al., "A Novel Technique for Modification of Images for Deuteranopic Viewers", May 2016.

Belytschko et al., "Assumed strain stabilization of the eight node hexahedral element," Computer Methods in Applied Mechanics and Engineering, vol. 105(2), pp. 225-260 (1993), 36 pages.

Belytschko et al., Nonlinear Finite Elements for Continua and Structures, Second Edition, Wiley (Jan. 2014), 727 pages (uploaded in 3 parts).

Blanz V, Vetter T. A morphable model for the synthesis of 3D faces. In Proceedings of the 26th annual conference on Computer graphics and interactive techniques Jul. 1, 1999 (pp. 187-194). ACM Press/Addison-Wesley Publishing Co.

Blanz et al., "Reanimating Faces in Images and Video" Sep. 2003, vol. 22, No. 3, pp. 641-650, 10 pages.

Chao et al., "A Simple Geometric Model for Elastic Deformations", 2010, 6 pgs.

Cook et al., Concepts and Applications of Finite Element Analysis, 1989, Sections 6-11 through 6-14.

Cournoyer et al., "Massive Crowd on Assassin's Creed Unity: AI Recycling," Mar. 2, 2015, 55 pages.

Dick et al., "A Hexahedral Multigrid Approach for Simulating Cuts in Deformable Objects", IEEE Transactions on Visualization and Computer Graphics, vol. X, No. X, Jul. 2010, 16 pgs.

Diziol et al., "Robust Real-Time Deformation of Incompressible Surface Meshes", to appear in Proceedings of the 2011 ACM SIGGRAPH/Eurographics Symposium on Computer Animation (2011), 10 pgs.

Dudash, Bryan. "Skinned instancing." NVidia white paper(2007).

Fikkan, Eirik. Incremental loading of terrain textures. MS thesis. Institutt for datateknikk og informasjonsvitenskap, 2013.

Geijtenbeek, T. et al., "Interactive Character Animation using Simulated Physics", Games and Virtual Worlds, Utrecht University, the Netherlands, the Eurographics Association 2011, 23 pgs.

Georgii et al., "Corotated Finite Elements Made Fast and Stable", Workshop in Virtual Reality Interaction and Physical Simulation VRIPHYS (2008), 9 pgs.

Habibie et al., "A Recurrent Variational Autoencoder for Human Motion Synthesis", 2017, in 12 pages.

Halder et al., "Image Color Transformation for Deuteranopia Patients using Daltonization", IOSR Journal of VLSI and Signal Processing (IOSR-JVSP) vol. 5, Issue 5, Ver. I (Sep.-Oct. 2015), pp. 15-20.

Han et al., "On-line Real-time Physics-based Predictive Motion Control with Balance Recovery," Eurographics, vol. 33(2), 2014, 10 pages.

Hernandez, Benjamin, et al. "Simulating and visualizing real-time crowds on GPU clusters." Computacion y Sistemas 18.4 (2014): 651-664.

Hu G, Chan CH, Yan F, Christmas W, Kittler J. Robust face recognition by an albedo based 3D morphable model. In Biometrics (IJCB), 2014 IEEE International Joint Conference on Sep. 29, 2014 (pp. 1-8). IEEE.

Hu Gousheng, Face Analysis using 3D Morphable Models, Ph.D. Thesis, University of Surrey, Apr. 2015, pp. 1-112.

Irving et al., "Invertible Finite Elements for Robust Simulation of Large Deformation", Eurographics/ACM SIGGRAPH Symposium on Computer Animation (2004), 11 pgs.

Kaufmann et al., "Flexible Simulation of Deformable Models Using Discontinuous Galerkin FEM", Oct. 1, 2008, 20 pgs.

Kavan et al., "Skinning with Dual Quaternions", 2007, 8 pgs.

Kim et al., "Long Range Attachments—A Method to Simulate Inextensible Clothing in Computer Games", Eurographics/ACM SIGGRAPH Symposium on Computer Animation (2012), 6 pgs.

Klein, Joseph. Rendering Textures up Close in a 3D Environment Using Adaptive Micro-Texturing. Diss. Mills College, 2012.

Komura et al., "Animating reactive motion using momentum-based inverse kinematics," Computer Animation and Virtual Worlds, vol. 16, pp. 213-223, 2005, 11 pages.

Lee, Y. et al., "Motion Fields for Interactive Character Animation", University of Washington, Bungie, Adobe Systems, 8 pgs, obtained Mar. 20, 2015.

Levine, S. et al., "Continuous Character Control with Low-Dimensional Embeddings", Stanford University, University of Washington, 10 pgs, obtained Mar. 20, 2015.

Macklin et al., "Position Based Fluids", to appear in ACM TOG 32(4), 2013, 5 pgs.

McAdams et al., "Efficient Elasticity for Character Skinning with Contact and Collisions", 2011, 11 pgs.

McDonnell, Rachel, et al. "Clone attack! perception of crowd variety." ACM Transactions on Graphics (TOG). vol. 27. No. 3. ACM, 2008.

Muller et al., "Meshless Deformations Based on Shape Matching", SIGGRAPH 2005, 29 pgs.

Muller et al., "Adding Physics to Animated Characters with Oriented Particles", Workshop on Virtual Reality Interaction and Physical Simulation VRIPHYS (2011), 10 pgs.

Muller et al., "Real Time Dynamic Fracture with Columetric Approximate Convex Decompositions", ACM Transactions of Graphics, Jul. 2013, 11 pgs.

Muller et al., "Position Based Dymanics", VRIPHYS 2006, Oct. 21, 2014, Computer Graphics, Korea University, 23 pgs.

Musse, Soraia Raupp, and Daniel Thalmann. "Hierarchical model for real time simulation of virtual human crowds." IEEE Transactions on Visualization and Computer Graphics 7.2 (2001): 152-164.

(56) References Cited

OTHER PUBLICATIONS

Nguyen et al., "Adaptive Dynamics With Hybrid Response," 2012, 4 pages.
O'Brien et al., "Graphical Modeling and Animation of Brittle Fracture", GVU Center and College of Computing, Georgia Institute of Technology, Reprinted from the Proceedings of ACM SIGGRAPH 99, 10 pgs, dated 1999.
Orin et al., "Centroidal dynamics of a humanoid robot," Auton Robot, vol. 35, pp. 161-176, 2013, 18 pages.
Parker et al., "Real-Time Deformation and Fracture in a Game Environment", Eurographics/ACM SIGGRAPH Symposium on Computer Animation (2009), 12 pgs.
Pelechano, Nuria, Jan M. Allbeck, and Norman I. Badler. "Controlling individual agents in high-density crowd simulation." Proceedings of the 2007 ACM SIGGRAPH/Eurographics symposium on Computer animation. Eurographics Association, 2007. APA.
Rivers et al., "FastLSM: Fast Lattice Shape Matching for Robust Real-Time Deformation", ACM Transactions on Graphics, vol. 26, No. 3, Article 82, Publication date: Jul. 2007, 6 pgs.
Ruiz, Sergio, et al. "Reducing memory requirements for diverse animated crowds." Proceedings of Motion on Games. ACM, 2013.
Rungjiratananon et al., "Elastic Rod Simulation by Chain Shape Matching withTwisting Effect" SIGGRAPH Asia 2010, Seoul, South Korea, Dec. 15-18, 2010, ISBN 978-1-4503-0439-9/10/0012, 2 pgs.
Seo et al., "Compression and Direct Manipulation of Complex Blendshape Models", In ACM Transactions on Graphics (TOG) Dec. 12, 2011 (vol. 30, No. 6, p. 164). ACM. (Year: 2011), 10 pgs.
Sifakis, Eftychios D., "FEM Simulations of 3D Deformable Solids: A Practioner's Guide to Theory, Discretization and Model Reduction. Part One: The Classical FEM Method and Discretization Methodology", SIGGRAPH 2012 Course, Version 1.0 [Jul. 10, 2012], 50 pgs.

Stomakhin et al., "Energetically Consistent Invertible Elasticity", Eurographics/ACM SIGGRAPH Symposium on Computer Animation (2012), 9 pgs.
Thalmann, Daniel, and Soraia Raupp Musse. "Crowd rendering." Crowd Simulation. Springer London, 2013. 195-227.
Thalmann, Daniel, and Soraia Raupp Musse. "Modeling of Populations." Crowd Simulation. Springer London, 2013. 31-80.
Treuille, A. et al., "Near-optimal Character Animation with Continuous Control", University of Washington, 2007, 7 pgs.
Ulicny, Branislav, and Daniel Thalmann. "Crowd simulation for interactive virtual environments and VR training systems." Computer Animation and Simulation 2001 (2001 ): 163-170.
Vaillant et al., "Implicit Skinning: Real-Time Skin Deformation with Contact Modeling", (2013) ACM Transactions on Graphics, vol. 32 (n° 4). pp. 1-11. ISSN 0730-0301, 12 pgs.
Vigueras, Guillermo, et al. "A distributed visualization system for crowd simulations." Integrated Computer-Aided Engineering 18.4 (2011 ): 349-363.
Wu et al., "Goal-Directed Stepping with Momentum Control," Eurographics/ ACM SIGGRAPH Symposium on Computer Animation, 2010, 6 pages.
Geijtenbeek et al. (Interactive Character Animation Using Simulated Physics: A State-of-the-Art Review), Computer Graphics forum, vol. 31, 2012 (Year: 2012), 24 pgs.
Clavet, "Motion matching and the road to next-gen animation," In Proc. of GDC. 2016 (Year: 2016).
Holden et al., "Phase-functioned neural networks for character control," ACM Transactions on Graphics (TOG). Jul. 20, 2017;36(4): 1-3. (Year: 2017).
Starke et al., "Local motion phases for learning multi-contact character movements." ACM Transactions on Graphics (TOG). Jul. 8, 2020;39(4):54-1 (Year: 2020).
Zhang et al., "Mode-adaptive neural networks for quadruped motion control. ACM Transactions on Graphics (TOG)." Jul. 30, 2018;37(4): 1-1. (Year: 2018).

\* cited by examiner

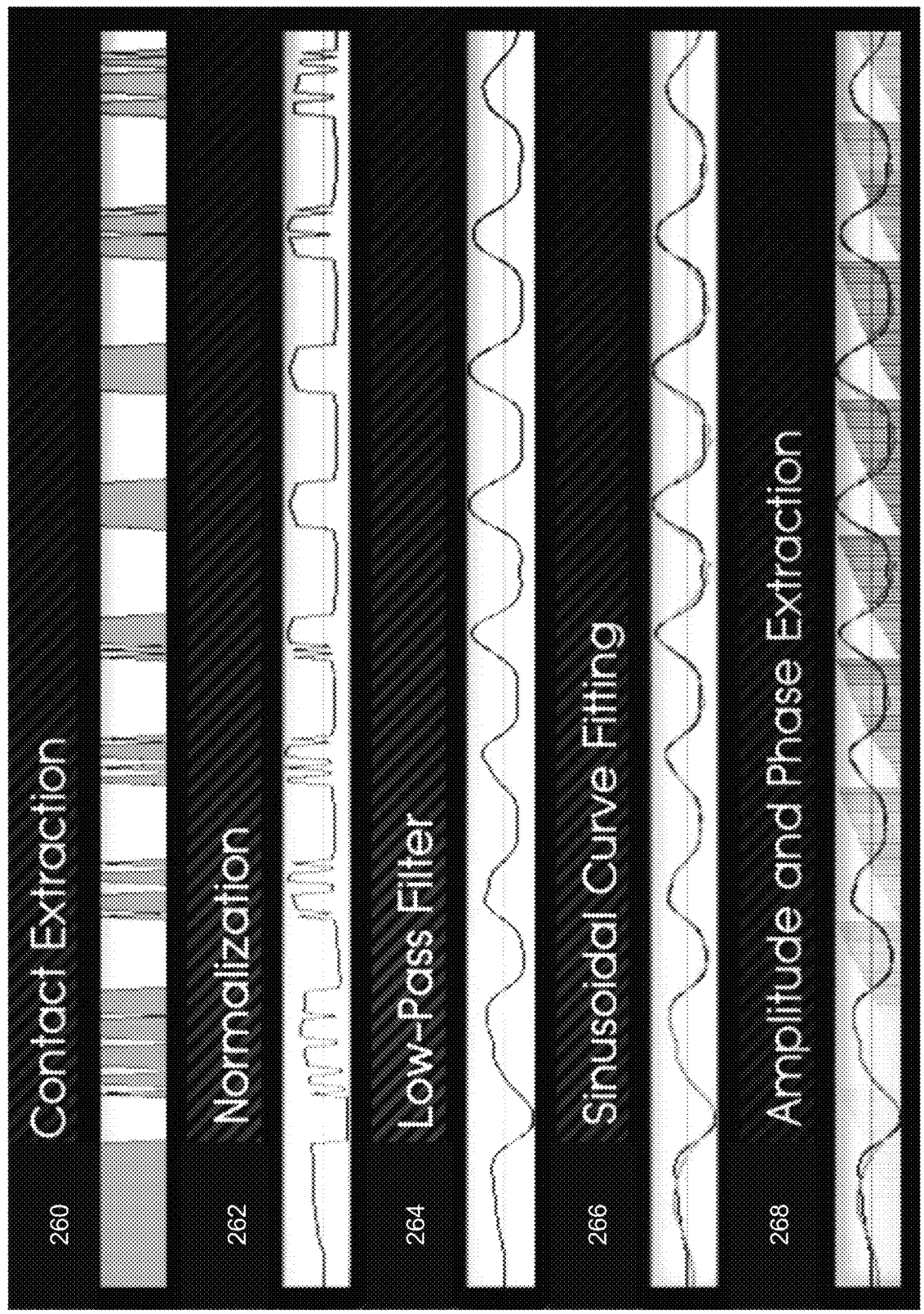

ENHANCED ANIMATION GENERATION BASED ON MOTION MATCHING USING LOCAL BONE PHASES

INCORPORATION BY REFERENCE TO ANY PRIORITY APPLICATIONS

Any and all applications for which a foreign or domestic priority claim is identified in the Application Data Sheet as filed with the present application are incorporated by reference under 37 CFR 1.57 and made a part of this specification.

TECHNICAL FIELD

The present disclosure relates to systems and techniques for animation generation. More specifically, this disclosure relates to using motion matching techniques with local bone phases for dynamically generating animation.

BACKGROUND

Electronic games are increasingly becoming more realistic due to an increase in available processing resources. This increase in realism may allow for more realistic gameplay experiences. For example, elements that form an in-game world, such as characters, may be more realistically presented. In this example, the elements may be increasingly rendered at higher resolutions, with more detailed textures, with more detailed underlying meshes, and so on. While this added realism may be beneficial to an end-user of an electronic game, it may place a substantial burden on electronic game developers. As an example, electronic game developers may be required to create very rich, and detailed, models of characters. As another example, electronic game designers may be required to create fluid, lifelike, movements of the characters.

With respect to the example of movement, characters may be designed to realistically adjust their arms, legs, and so on, while traversing an in-game world. In this way, the characters may walk, run, jump, and so on, in a lifelike manner. With respect to a sports electronic game, substantial time may be spent ensuring that the characters appear to mimic real-world sports players. For example, electronic game designers may spend substantial time fine-tuning movements of an underlying character model. Movement of a character model may be, at least in part, implemented based on movement of an underlying skeleton. For example, a skeleton may include a multitude of objects (e.g., bones or joints) which may represent a portion of the character model. As an example, a first object may be a finger while a second object may correspond to a wrist. The skeleton may therefore represent an underlying form on which the character model is built. In this way, movement of the skeleton may cause a corresponding adjustment of the character model.

To create realistic movement, an electronic game designer may therefore adjust positions of the above-described objects included in the skeleton. For example, the electronic game designer may create realistic running via adjustment of specific objects which form a character model's legs. This manual tuning technique to enable movement of a character can result in substantial complexity and significant expenditure of time by developers.

SUMMARY OF CERTAIN EMBODIMENTS

Particular embodiments of the subject matter described in this specification can be implemented so as to realize one or more of the following advantages. Utilizing the techniques described herein, realistic motion may be rapidly generated for arbitrary character models configured for use in electronic games. As will be described, motion capture information can be used to generate information usable to create rich, life-like, animations for character models. Advantageously, these animations may be responsive to real-time user input being provided by a user of an electronic game. The animation system can use local phase information extracted based on how individual body parts of a motion capture actor contacts external objects. This phase information may therefore represent local bone phases corresponding to bones (e.g., arms, legs, hands) of the actor, and may be used to enhance the temporal alignment, and segmentation, of realistic motion for use during motion matching on each local bone phase.

At present, techniques to generate realistic motion for character models may rely upon designers adjusting character models to define different types of motion. For example, to define running, a designer may string together certain adjustments of joints on a skeleton of a character model. In this example, the designer may adjust the knees, cause a movement of the arms, and so on. While this may allow for motion to be generated, it may also involve a substantial burden on the designer.

A first example technique to, at least in part, automate generation of character motion, may include using software to automatically adjust a skeleton. For example, templates of running may be pre-defined. In this example, a designer may select a running template which may cause adjustment of the joints on a skeleton. Thus, the designer may more rapidly generate motion for characters in an in-game world. However, this first example technique may lack the realism of real-world movement. For example, since different templates are being selected, the lifelike differences in movement between real-world persons is lost.

In contrast, the techniques described herein allow for the rapid generation of character animation based on automated analyses of motion capture information. For example, an actor may be placed in a motion capture studio. The actor may then perform different movements, and movement of different portions of the actor (e.g., joints) may be stored by a system. Additionally, contact with an external environment may be recorded. Thus, the specific foot fall pattern used by an upper echelon boxer or basketball player may be recorded. Additionally, the specific contact made by an actor's hands with respect to a basketball, football, and so on, may be recorded. This recorded information, referred to herein as local bone phases, may be used to increase a realism associated with animation generation.

The animation system can use local motion matching phases for each local bone phase in order to generate animation based on motion capture information. This segmented approach using local motion matching phases may allow for enhanced nuance associated with the animation. As an example, a real-life wrestler may be used as an actor. In this example, video of the wrestler may be recorded which depicts the wrestler moving about a ring, interacting with an opponent, performing different moves, and so on. Local bone phase data can be generated based on this video, such that the data can be used during the local motion matching processes to reproduce highly stylized, and personal, movement of the wrestler.

The techniques described herein therefore improve upon the functioning of prior software-based techniques to generate movement of in-game character models. As described above, prior techniques relied upon by designers to adjust positions of joints on a skeleton underlying a character model. For example, different key frames or clips of animation may be produced. In this example, an electronic game may interpolate between key frames or play these clips of animation. In contrast, the techniques described herein allow for real-time generation of motion of the character model. The motion may adhere to motion analyzed from one or more motion capture actors. Advantageously, the animation system can reproduce specific motions performed by the actors while also being able to generate animations which were not specifically depicted in the motion capture information.

The systems, methods, and devices of this disclosure each have several innovative aspects, no single one of which is solely responsible for the all of the desirable attributes disclosed herein. Although certain embodiments and examples are disclosed herein, inventive subject matter extends beyond the examples in the specifically disclosed embodiments to other alternative embodiments and/or uses, and to modifications and equivalents thereof.

One embodiment discloses a computer-implemented method comprising: as implemented by a computing system having at least one processor configured with specific computer-executable instructions, accessing first animation control information generated by a for a first frame of an electronic game, the first animation control information including a first character pose of the in-game character and, at least, a plurality of local bone phases associated with an in-game character of the electronic game, individual local bone phases representing phase information associated with contacts of at least one rigid bodies of the in-game character with an in-game environment; executing a local motion matching process for each of the plurality of local bone phases resulting in a plurality of matched local poses, the local motion matching process comprising: determining motion matching criteria for matching the local bone phase to local pose animation data for the corresponding local bone phase; and selecting a local pose from a plurality of eligible local poses corresponding to the local bone phase; generating a second pose of the character model based on the plurality of matched local poses for a second frame of the electronic game; and computing second animation control information for the second frame; and rendering the second frame including at least a portion of the second character pose of the in-game character within the in-game environment based, at least in part, on the second animation control information.

In some embodiments, the local bone phase is represented by a two dimensional vector encoded with local bone phase characteristics of the local bone phase. In some embodiments, the local bone phase characteristic include position, orientation, velocity, and acceleration of the bone. In some embodiments, selecting the local pose comprises performing a nearest neighbor search using the two dimensional vector of the local bone phase as compared to two dimensional vectors of local poses in the animation data. In some embodiments, determining motion matching criteria comprises identifying a motion type associated with the second pose of the in-game character. In some embodiments, determining motion matching criteria comprises identifying a subset of the animation data corresponding to the motion type. In some embodiments, generating the second pose of the character model comprises blending the plurality of local poses with a global pose to generate the second pose. In some embodiments, the first animation control information comprises information aggregated over a prior threshold number of frames. In some embodiments, the local bone phases further represent phase information associated with an external object configured to be interacted with by the in-game character. In some embodiments, the second animation control information includes updated local bone phases, and wherein the updated local bone phases are determined via interpolation of the local bone phases included in the first animation control information.

Another embodiment discloses a system comprising one or more processors and non-transitory computer storage media storing computer-readable instructions that when executed by the one or more processors, cause the one or more processors to perform operations comprising: accessing first animation control information generated by a for a first frame of an electronic game, the first animation control information including a first character pose of the in-game character and, at least, a plurality of local bone phases associated with an in-game character of the electronic game, individual local bone phases representing phase information associated with contacts of at least one rigid bodies of the in-game character with an in-game environment; executing a local motion matching process for each of the plurality of local bone phases resulting in a plurality of matched local poses, the local motion matching process comprising: determining motion matching criteria for matching the local bone phase to local pose animation data for the corresponding local bone phase; and selecting a local pose from a plurality of eligible local poses corresponding to the local bone phase; generating a second pose of the character model based on the plurality of matched local poses for a second frame of the electronic game; computing second animation control information for the second frame; and rendering the second frame including at least a portion of the second character pose of the in-game character within the in-game environment based, at least in part, on the second animation control information.

In some embodiments, the local bone phase is represented by a two dimensional vector encoded with local bone phase characteristics of the local bone phase. In some embodiments, the local bone phase characteristic include position, orientation, velocity, and acceleration of the bone. In some embodiments, the computer-readable instructions further configure the one or more processors to perform a nearest neighbor search using the two dimensional vector of the local bone phase as compared to two dimensional vectors of local poses in the animation data when selecting the local pose. In some embodiments, the computer-readable instructions further configure the one or more processors to identify a motion type associated with the second pose of the in-game character when determining motion matching criteria. In some embodiments, the computer-readable instructions further configure the one or more processors to identify a subset of the animation data corresponding to the motion type when determining motion matching criteria. In some embodiments, the computer-readable instructions further configure the one or more processors to blend the plurality of local poses with a global pose to generate the second pose when generating the second pose of the character model. In some embodiments, the first animation control information comprises information aggregated over a prior threshold number of frames. In some embodiments, the local bone phases further represent phase information associated with an external object configured to be interacted with by the in-game character. In some embodiments, the second animation control information includes updated local bone phases, and wherein the updated local bone phases are determined via interpolation of the local bone phases included in the first animation control information.

The details, including optional details, of one or more embodiments of the subject matter of this specification are set forth in the accompanying drawings and the description below. Other optional features, aspects, and advantages of the subject matter will become apparent from the description, the drawings, and the claims.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

FIG. 2C illustrates example graphical representations of the process for determining local bone phase.

Like reference numbers and designations in the various drawings indicate like elements.

DETAILED DESCRIPTION

Overview

Figure 1A:
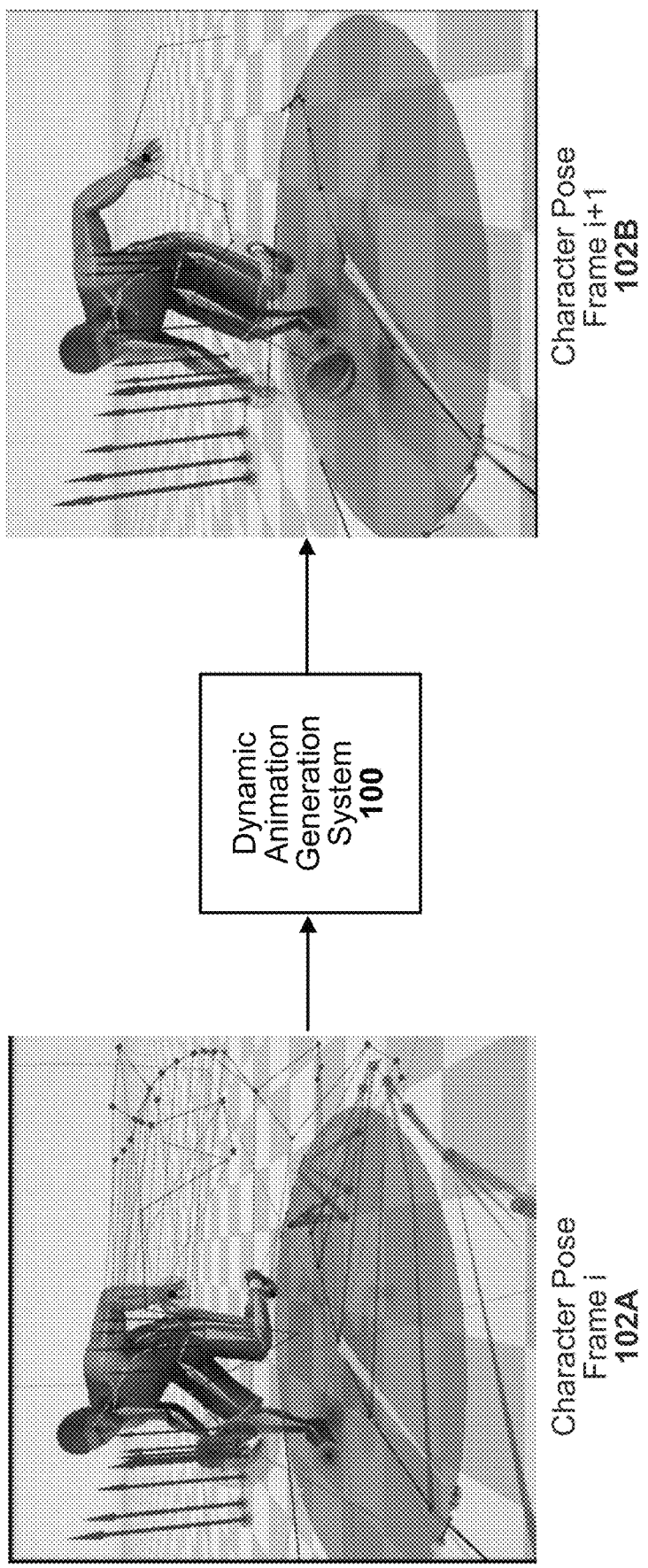
FIG. 1A is a block diagram of an example dynamic animation generation system generating a character pose for a frame of an electronic game.

This specification describes, among other things, technical improvements with respect to generation of motion for characters configured for use in electronic games. As will be described, a system (e.g., the dynamic animation generation system 100) may implement a motion matching engine to generate realistic motion based on analyses of motion capture information. Advantageously, the system may perform substantially automated analyses of the motion capture information such that complex labeling processes and manual tuning by developers may be avoided. While electronic games are described, it may be appreciated that the techniques described herein may be applied generally to movement of character models. For example, animated content (e.g., TV shows, movies) may employ the techniques described herein.

As will be described, the system may generate realistic motion using local bone phases learned from motion capture information. The local bone phases may encode contacts with an external environment by portions of a motion capture actor. For example, contacts by the actors left and right feet may be recorded. In this example, specifically foot patterns may be recorded. The local bone phases may encode the contacts into a temporal phase space, which may enhance an understanding of temporal alignment and segmentation of motion.

As will be described, the local bone phase may be used in conjunction with local motion matching phases to generate dynamic and realistic animations. A motion matching engine can be used to segment the motion matching process based on the local bone phases in order to generate a pose for a character. The motion matching engine can have a local motion matching phase for each local bone phase. The temporal phase space of a local bone phase can be represented as a two dimensional phase vector. The two dimensional phase vector encodes characteristics of the local bone phase such as position, velocity, orientation, acceleration, and other characteristics. In each local motion matching phase, the motion matching engine can use the two dimensional phase vectors to identify a best match within the motion capture information for the specific local bone phase. By segmenting the motion matching into local matching phases, the motion matching engine 120 can better define a cost function for matching the motion of the bone (e.g., foot, hand, etc.) with the motion capture data. After identifying the motion match for each local bone phase, the pose generation system 130 can generate a global output pose for the character model. The pose generation system 130 can blend the outputs for each local bone phase to determine the output pose for the character. As will be described, realistic animations may be generated by the system based on this understanding.

Background—Motion Generation

Motion may be defined, at least in part, based on distinct poses of an in-game character. As an example, each pose may represent a discrete sample of the motion to be performed by the in-game character. For this example, the pose may identify positions of bones or joints of the in-game character. Thus, if motion is to depict running, each pose may represent a snapshot of the running. For example, a first frame generated by an electronic game may include the in-game character with both feet on a surface within the game world. As another example, a second frame may include the in-game character beginning to move one of the feet upwards. It may be appreciated that subsequent frames may include the in-game character moving forward in a running motion.

Typically, the above-described in-game character may be animated to produce this running motion. For example, an electronic game designer may generate different key frames which depict poses used for the running motion. In this example, the electronic game designer may create key frames which depict the in-game character with its feet on a surface, with one leg partially raised upwards, and so on. During gameplay, the electronic game may interpolate between these key-frames such that the in-game character appears to transition between them. As another example, clips of animation may be generated by the electronic game designer for specific motions. In this example, one or more clips of animation may be generated to represent the running motion. These clips may then be played by the electronic game to produce animation.

To generate motions for in-game characters, electronic game designers are increasingly leveraging motion capture studios. For example, a motion capture studio may be used to learn the realistic gait of an actor as he/she moves about the motion capture studio. Specific portions of the actor, such as joints or bones, may be monitored during this movement. Subsequently, movement of these portions may be extracted from image or video data of the actor. This movement may then be translated onto a skeleton or rig for use as an underlying framework of one or more in-game characters. The skeleton or rig may include bones, which may be adjusted based on the motion capture images or video. In this way, the skeleton or rig may be animated to reproduce motion performed by the actor.

While motion capture studios allow for realistic motion, they are limited in the types of motion able to be reproduced. For example, the above-described skeleton may be animated to reproduced motions which were specifically performed by the actor. Other motions may thus need to be manually created by an electronic game designer. For example, and with respect to a sports electronic game, a real-life basketball player may be used as an actor to perform common basketball motions. While this actor may perform a wide breadth of motions typically performed during a basketball game, as may be appreciated there are other motions which will not be recorded. For example, these other motions may be produced naturally by the actor during a real-world basketball game depending on locations of opponents, the actor's current stamina level, a location of the actor with respect to the basketball court, and so on.

Previous efforts at motion matching were used based on global matching of pose data with motion matching data. However, the global motion matching is limited to cyclic movements with start and end points. The global motion matching had difficulty automatically generating matches for asynchronous movements. This results in the loss of detail of individual asynchronous movements associated with individual pose. The asynchronous characteristics of the movement filtered out as system attempts to match the global characteristics of the character movement with the motion capture pose. Accordingly, global motion matching is generally limited to cyclic movements. Asynchronous or acyclic movements need to be manually programmed by the developers, which is a highly labor intensive process.

Local Bone Phases

As will be described, the animation techniques described herein may leverage phase information associated with bones of an actor in a motion capture studio. A bone, as described herein, may represent a specific portion of the actor which is being monitored in images or video obtained using the motion capture studio. A bone may also represent an object which is external to the actor but for which motion is to be learned. Example bones described herein may include a left hand, a right hand, a left foot, a right foot, a ball (e.g., basketball), and so on. A bone may also be referred to herein as a rigid body.

The phase information, referred to herein as 'local bone phases', may be determined independently for each of the bones. As will be described, phase information for a bone may be determined based on contacts by the bone with an external environment. For example, an actor's left hand contacting a ball, an opponent, a rim, a net, other portions of the actor, and so on, may be identified using video or images of the actor in the motion capture studio. Contacts with the left hand may be aggregated over a period of time and may be represented as a signal, such as signal 260 illustrated in FIG. 2C. The signal may, for example, indicate times at which contact occurred.

The system described herein may analyze the above-described contact signals, for different periods of time within the motion capture information, and determine local bone phases for these periods of time. Advantageously, motion of the actor may be describable, at least in part, based on these local bone phases. Thus, a specific bouncing pattern of a basketball may be identified. As may be appreciated, the bouncing pattern may be highly variable and asynchronous during a real-world basketball game. For example, a basketball player may more rapidly bounce the ball as the player runs up a court. As another example, a basketball player may bounce the ball with a varied frequency depending on a location of an opponent with respect to the player. These differences may be recorded as local bone phases for different periods of time within the motion capture information. Similarly, the specific footwork used by a basketball player to evade an opponent may be identified. This footwork may substantially vary depending on a distance of the player to the opponent. The footwork may also vary depending on whether the player is trying to evade the opponent.

The animation system described herein may thus be configured to use these local bone phases. For example, a motion matching engine 120 may generate motion matches for each local bone phase of a character model. In this example, the pose generation engine may use the motion matches for each of the local bone phases to output character poses to generate animation. Advantageously, the motion matching engine 120 may be conditioned on motion types of the local bone phases such that the generated animation is based on the above-described contact patterns for the different motion types. The animation system may produce natural motion for in-game characters while adhering to the complex asynchronous ball patterns, footwork patterns, and so on described above.

These, and other features, will now be described in more detail.

Dynamic Animation Generation System

FIG. 1A is a block diagram of an example dynamic animation generation system 100 generating a subsequent character pose 102B based on a current character pose 102A. The illustrated dynamic animation generation system 100 may represent a system of one or more computers, one or more virtual machines executing on a system of one or more computers, and so on. In some embodiments, the dynamic animation generation system 100 may represent an application, or other software, which is executed by an electronic game system. Thus, the functionality described herein may be implemented by an electronic game system during gameplay of an electronic game. As will be described, the dynamic animation generation system 100 may implement a motion matching engine 120 and pose generation engine 130 to autoregressively output character poses to generate motion.

In the illustrated example, the character pose 102A depicts an in-game character dribbling a basketball. This character pose 102A may therefore represent a specific pose used in the dribbling motion. Additionally, this character pose 102A may be rendered for output in a particular frame of animation (e.g., frame i). As may be appreciated, fluid animation may be generated at a threshold frame rate (e.g., 30 frames per second, 60 frames per second). Thus, the particular frame of animation may represent one of these frames.

As will be described in more detail, the dynamic animation generation system 100 can generate the subsequent character pose 102B based on the character pose 102A. This subsequent character pose 102B may then be rendered for output in a subsequent frame of animation (e.g., frame i+1). For example, the dynamic animation generation system 100 may determine positions, orientations, and so on, of a skeleton or rig which underlies the illustrated in-game character. In this example, the in-game character may be rendered to conform to these determined positions, orientations, such that the subsequent pose 102B may be output.

The dynamic animation generation system 100 may autoregressively generate character poses. For example, FIG. 1A illustrates the subsequent character pose 102B being generated based on character pose 102A. Thereafter, the subsequent character pose 102B may be used, at least in part, to generate another character pose. As will be described, this generation may be informed based on user input provided by an end-user using an input controller. Thus, the end-user may guide the resulting animation via interactions with the input controller.

Figure 1B:
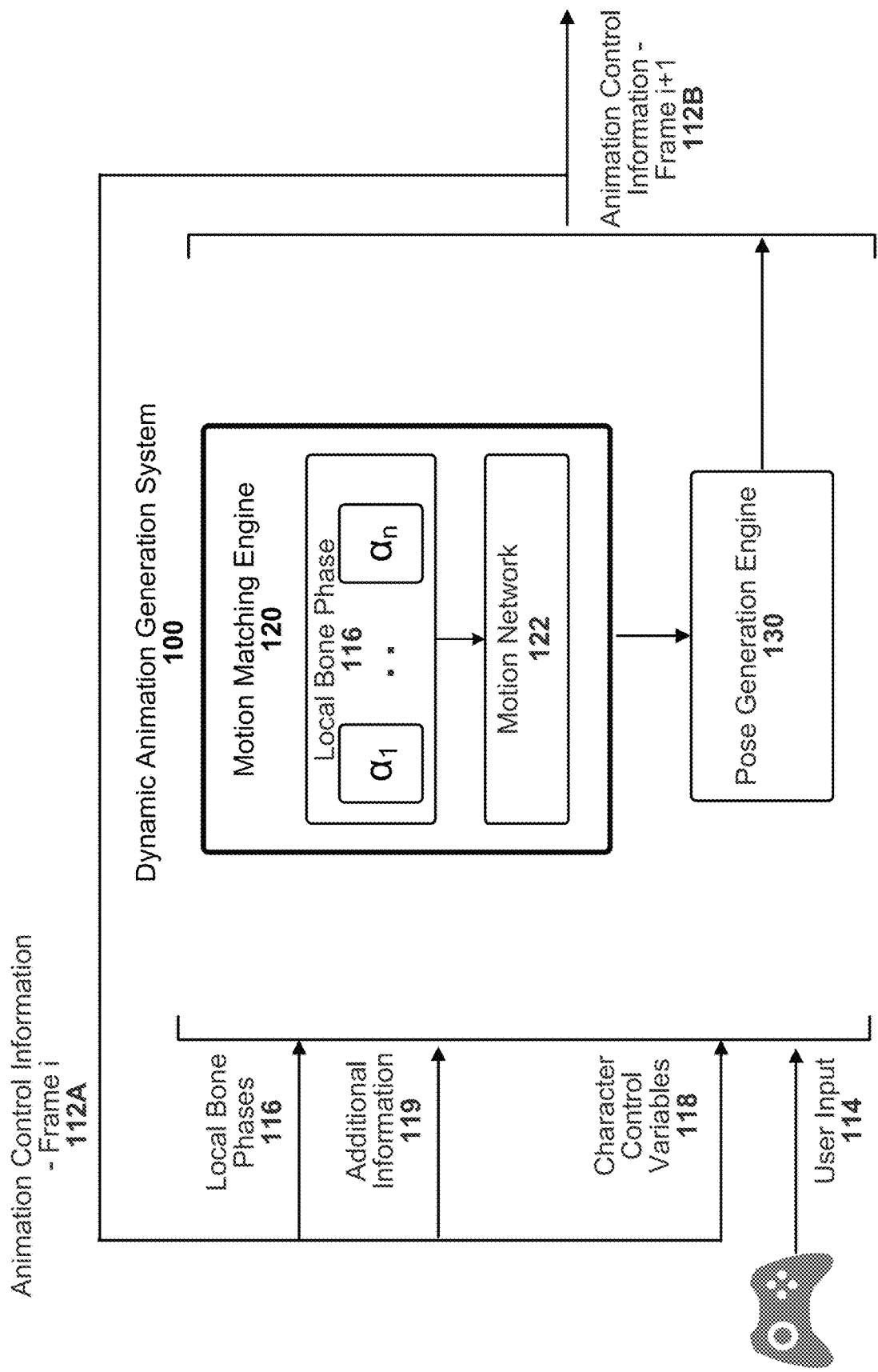
FIG. 1B is a detail block diagram of the dynamic animation generation system.

FIG. 1B is a block diagram illustrating detail of the dynamic animation generation system 100. In this illustrated example, the dynamic animation generation system 100 includes example engines 120 and 130, which are collectively usable to dynamically generate animation.

Animation Control Information

The dynamic animation generation system 100 may generate particular information, referred to herein as 'animation control information', which may be autoregressively used to generate motion for an in-game character. For example, the animation control information may indicate a character pose (e.g., character poses 102A-102B illustrated in FIG. 1A). As illustrated, animation control information 112A generated for a first frame (e.g., frame 'i') may be used as an input for a second frame (e.g., frame 'i+1'). Animation control information 112B for the second frame may be generated by the system 100, and an underlying skeleton or rig of an in-game character may be updated according to an indicated character pose for the second frame.

In addition to character pose, the animation control information 112A may include local bone phases 116. As described herein, local bone phases may be determined based on motion capture information of one or more actors. For example, the local bone phases 116 may be determined according to contacts between certain bones (e.g., portions of the actor) with an external environment. In this example, the bones may include the hands, feet, head, and so on, of the actor. Local bone phases may therefore represent a temporal phase space associated with different types of motion of the actor. The local bone phases can be represented by 2D phase vectors. As will be described, the local bone phases may be determined for different periods of time within the motion capture information. Thus, local bone phases may be specific to subsets of the motion capture information, such as a motion type. With respect to a particular type of motion, such as dribbling while evading an opponent, the combination of local bone phases may encode the unique segmentation of motion associated with this dribbling. For example, the specific dribbling patterns, foot fall patterns, and so on may be captured in this phase space.

During runtime, such as during gameplay, local bone phases 116 may be generated for an in-game character. For example, the dynamic animation generation system 100 may autoregressively update local bone phases according to the gameplay. As an end user controls an in-game character, the dynamic animation generation system 100 may update the local bone phases according to the character's contact with an in-game environment.

Animation control information 112A may further include character control variables 118. These variables 118 may inform the in-game character's motion. For example, the character control variables 118 may include trajectory information for the in-game character. In this example, the trajectory information may indicate positions of the in-game character (e.g., a current position and optionally one or more prior positions), velocity of the in-game character (current velocity and optionally one or more prior velocities), and so on. The character control variables 118 may be used to predict subsequent motion of the in-game character. For example, if the in-game character is running forward in frame 'i' then it may be determined that the in-game character will remain running forward in frame 'i+1'.

Character control variables 118 may additionally include interaction vectors which are usable to describe motion associated with the in-game character's interaction with an external object or environment (e.g., a basketball) within a game world. For example, and with respect to a basketball game, the interaction vectors may be used to direct ball control, such as ball dribbling (e.g., location, speed, height), controlling switching and turning maneuvers, and also the position of the ball. To determine the interaction vectors, the system may determine three-dimensional pivot vectors associated with the character. For example, the three-dimensional pivot vectors may represent horizontally-normalized vectors around a root of the character. The character control variables may further include label information used to describe specific types of motion or actions which the character is performing. Example labels may include Stand or Move and may therefore indicate whether the character is standing or moving for a window of frames centered on a particular frame. With respect to basketball, example labels may include Dribbling, Holding, Shooting, Passing, and so on.

While the character control variables 118 may be used to predict motion, as may be appreciated the end user may adjust the in-game character's motion via user input 114. For example, the end user may utilize an electronic game controller to provide user input in the form of interactions with buttons, control sticks, and so on. In the above-described example in which the in-game character is running, the end user may provide user input 114 to maintain the running. For example, the user input 114 may indicate that a certain control stick is being pushed forward. However, the user input 114 may also indicate that the in-game character is to cease running or perform another movement (e.g., jump, shift directions, stop and shoot a basketball, and so on).

The character control variables 118 and user input 114 may therefore be combined by the dynamic animation generation system 100. In this way, the user input 114 may provide adjustments to motion predicted in frame 'i'. In some embodiments, the character control variables 118 and user input 114 may be separately weighted prior to combining. Therefore, a greater or lesser weight may be applied to the user input 114.

The animation control information 112A may further include additional information 119. For example, character state information associated with an in-game character may be included. The character state may indicate, for example, the character pose for the in-game character. For example, the character state may represent positions, rotations, and velocities of bones used in an underlying skeleton or rig of the in-game character.

The additional information 119 may further include conditioning features. For example, conditioning features may be used to describe contacts by the in-game character with an in-game environment. In this example, the contacts may indicate contacts with hands, feet, a head, an external object (e.g., a basketball), and so on, by the in-game character with an in-game environment. As may be appreciated, these contacts may be used by the dynamic animation generation system 100 to inform the updating of the local bone phases 116 described above.

With respect to a sports electronic game, the conditioning features may additionally include ball movement information. For example, the position and velocity of an in-game basketball may be utilized by the system 100 to dynamically generate animation. In this example, the basketball may be used to inform movement of the in-game character's hands, movement of the ball itself, and so on.

The additional information 119 may further include opponent information. For example, the opponent information may reflect a state of an in-game opponent with respect to the in-game character. Example information may include labels indicating whether the opponent (or portions thereof) are within a threshold radius of the in-game character. Example information may further include vectors indicating position samples between the opponent and in-game character along with direction and velocity of the opponent trajectory. An illustration of opponent information is included in FIG. 5B. As will be described, the dynamic animation generation system 100 may be trained in some embodiments using motion capture information which includes motion of an actor and at least one other actor representing an opponent. The dynamic animation generation system 100 may use captured data that are indicative of the actor's motions to handle proximity of the other actor.

Motion Matching Engine

With respect to the illustrated example, the animation control information 112A for frame 'i' may then be provided to motion matching engine 120. The motion matching engine 120 is configured to perform local motion matching phases using the local bone phase 116. Rather than doing a global motion match for the entire character pose, the motion matching engine 120 segments the motion matching process into individual phases, where each local bone phase undergoes a separate motion matching process. By increasing the granularity of motion matching, the motion matching engine 120 can reduce that conflicting movements of the character's limbs and preserve movement detail. For example, each foot may have different position, velocity, and trajectory information, that is conflicting for a specific movement. These asynchronous movements can be captured by using local motion matching phases, thereby increasing the detail and realism of a character's movements.

The motion network 122 may provide rules and weights for using motion matching to match the individual local bone phases 116. The motion network can define rules and weights that are specific to different motion types in order to better match and generate certain types of motion. The motion network 122 can define cost functions and searching criteria for use in identifying matches during a search, such as a nearest neighbor search. The motion network can further define changes in the search vector and segmentation of search data, such as segmenting search data based on motion type. The motion network can determine how to perform motion matching for each of the local bone phases. The motion network can contain information for augmenting the phase features with additional information such as labels identifying movement styles or action type. The matching criteria can be based on user input 114, character control variables 118, and the additional information 119. In some embodiments, for each local bone phase, the motion matching engine can perform a nearest neighbor search to identify the closest match. The cost functions defined by the motion network can vary based on motion type as well as by local bone phase. The weights for each of the variables in the cost function can be individually tuned. The motion matching engine can execute the local motion matching process for each local bone phase 116.

Pose Generation Engine

To generate the animation control information 112B for frame 'i+1', the dynamic animation generation system 100 includes a pose generation system 130. As described above, the motion matching engine 120 may determine the matches for each local bone phase 116. For example, the motion matching engine can determine local bone phase 124 match for right and left feet, the right and left hands, and a ball. The local bone phase are segmentations of the character motion, which map to a full-body pose for character. The pose generation system 130 can blend the local bone phase matches with the character model to generate an updated character pose. The updated character pose can be output as animation control information 112B. The pose generation system 130 can use blending to reduce the occurrence of blurry, or otherwise unnatural, motions in order to adapt to different types of motions and tasks.

In this way, the pose generation system 130 can generate an updated pose, at least in part, during runtime for each frame, or a subset of frames, based on an output of the motion matching engine 120. The pose generation system 130 may also use the additional information 119 for frame 'i' along with the user input 114. A forward pass through the pose generation system 130 may be computed and the animation control information 112B for frame 'i+1' may be output by the dynamic animation generation system 100.

Therefore, the pose generation system 130 may output a character pose for frame 'i+1'. Similar to the above, the animation control information 112B may then be provided as input to the dynamic animation generation system 100, which may continue autoregressively generating motion for the in-game character. The generated motion may be animated by the in-game character through adjustment of, at least, the character pose Local Bone Phase Process To ensure that asynchronous motion may be generated, such as motion for fast-paced sports games, the dynamic animation generation system 100 may use local bone phases for a multitude of bones associated with motion capture information. In the examples described below, the bones may include a left foot, a right foot, a left hand, a right hand, and a ball which is external to, and can be controlled by, an actor. Thus, the bones include example end effectors along with the ball.

It may be appreciated that these bones may refer to other elements of a character model and still fall within the scope of the disclosure herein. For example, additional bones may relate to specific fingers of the actor. Additional bones may further relate to rotational information associated with an actor. As an example, a bone may represent a rotation of a knee representing an extension of an actor's leg. This may be useful for electronic games for which motion requires complex rotations. Example electronic games may include wrestling games, racing games, and so on. A bone may represent a rotation of an actor's foot about an ankle. Similarly, additional bones may relate to additional objects which are utilized by an actor. With respect to sports games, a hockey stick, bat, and so on may represent one or more bones. Furthermore, quadrupeds may be used in a motion capture studio. For quadrupeds, such as dogs, the four legs of the dog may represent the bones optionally along with the tail and/or snout.

Figure 2A:
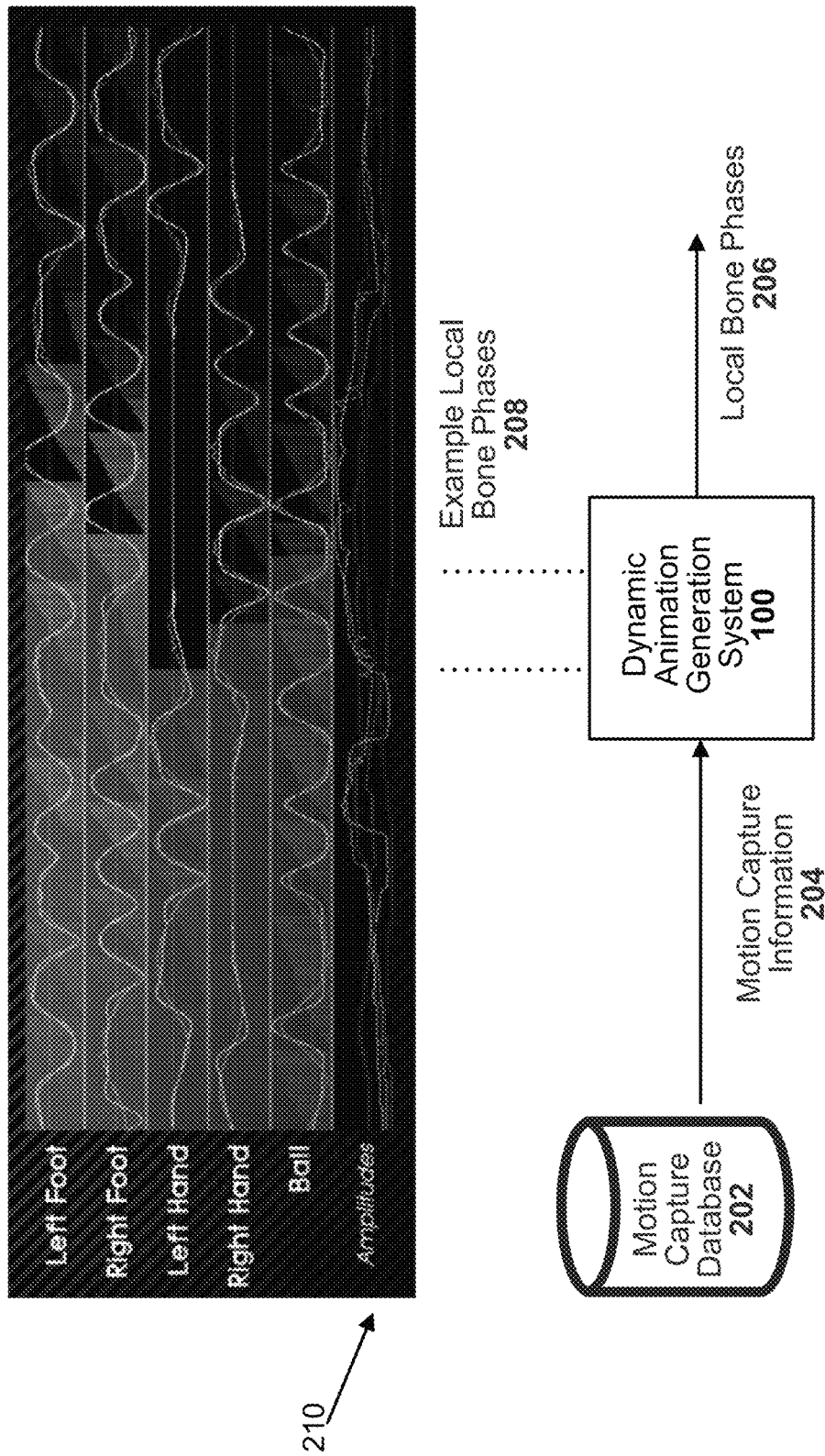
FIG. 2A is a block diagram of the dynamic animation generation system determining local bone phases based on motion capture information.
Figure 2B:
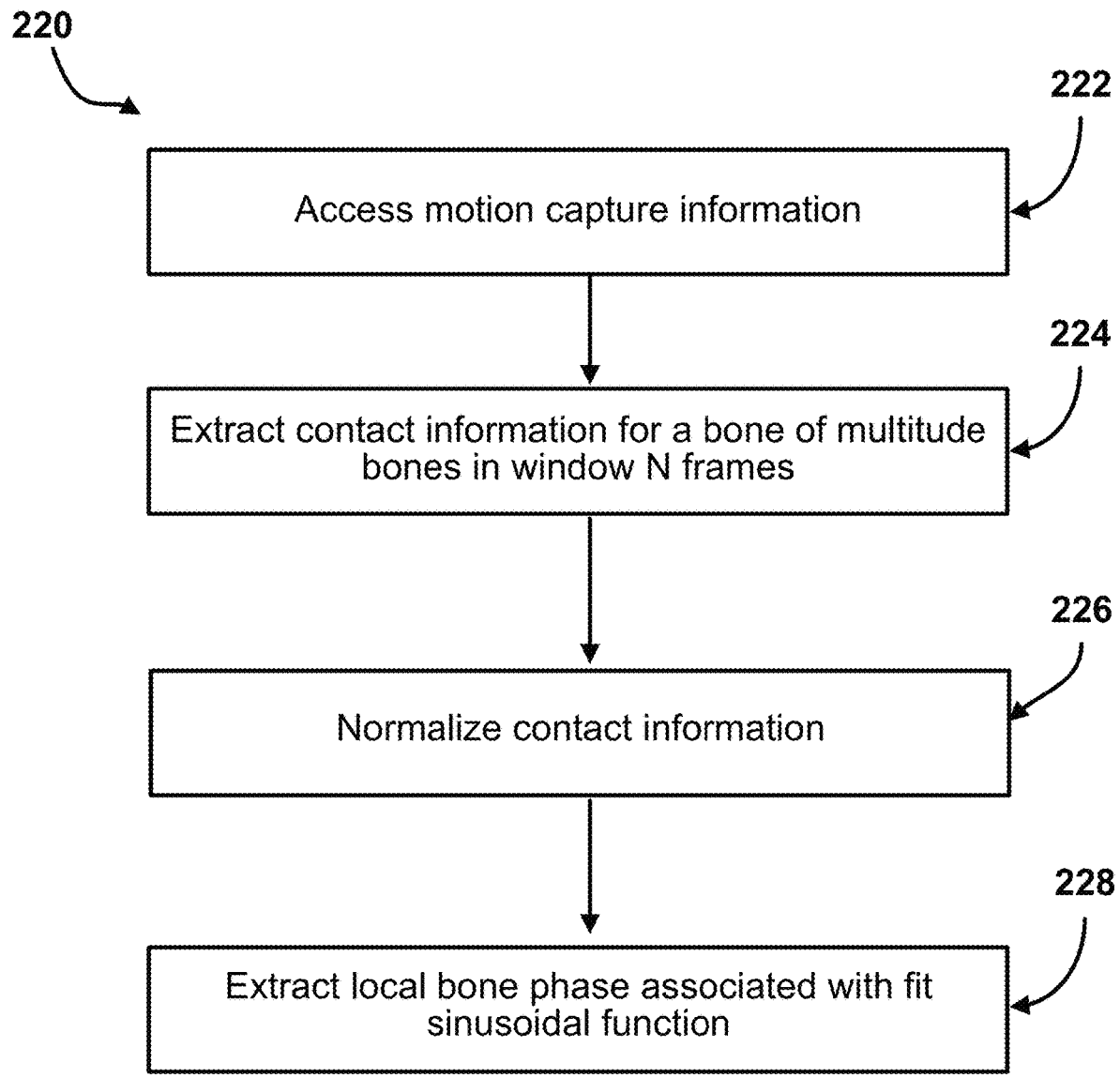
FIG. 2B is a flowchart of an example process for determining a local bone phase.

FIGS. 2A-2C describe examples for generating local bone phases based on motion capture information. FIGS. 4A-4B describes the mmm being used to generate a character pose based on local bone phases.

FIG. 2A is a block diagram of the dynamic animation generation system 100 determining local bone phases 206 based on motion capture information 204. In the illustrated example, the dynamic animation generation system 100 is obtaining the motion capture training information 204 from a motion capture database 202. As described herein, the local bone phases 206 may be determined based on contact information with an external environment. In some embodiments, the local bone phases 206 may be specific to a frame of motion capture information which is centered on N frames of the motion capture information. Thus, a sliding window may be used to determine local bone phases for individual frames of the motion capture information 204. In this way, the local bone phases for may be determined for different periods of time of the motion capture information (e.g., successively learning local bone phases for N frames). An example of determining a local bone phase for a frame is described below, with respect to FIGS. 2B-2C.

Example local bone phases 208 are illustrated in FIG. 2A. These local bone phases are included for specific bones and, as described herein, may be independent and separately determined. Thus, the techniques described herein may avoid the complexities and inaccuracies associated with a global phase. As an example, a global phase may be used to globally align an entire body of an actor. It may be appreciated that such global alignment may be impractical for asynchronous and complex interactions. Additionally, a global phase may require an understanding of a starting and stopping point for a particular motion. Thus, a global phase may be used to indicate when an actor starts and stops running. However, for complex actions there may be no global starting and stopping point. Therefore, local phase for each bone may be analyzed and the local phases for frames of motion capture information may be used without defined starting and stopping points.

The example local bone phases 208 therefore indicate phase information for an actor's left foot, right foot, left hand, right hand, and also for a ball (e.g., a basketball). Additionally, amplitudes 210 are illustrated in FIG. 2A. The amplitudes may be extracted as parameters from the local bone phases 208 and used to represent motion. For example, if the actor's left hand is not moving then the associated amplitude will reduce the local bone phase to zero. In contrast, if at the same time the actor's right foot is moving then the associated amplitude will increase. As another example, the amplitude 210 may be used to separate slower and faster movements of similar contact patterns (e.g., walking vs running or dribbling at different speeds).

FIG. 2B is a flowchart of an example process 220 for determining a local bone phase. For convenience, the process 220 will be described as being performed by a system of one or more computers (e.g., the dynamic animation generation system 100).

At block 222, the system accesses motion capture information. The information may be stored according to different motion capture formats, such as BVH and so on. Optionally, the motion capture information may represent image or video data taken at a particular frame rate. Thus, there may be 24, 30, 60, frames per second, which depict an actor moving about a motion capture studio. Optionally, the actor may have markers usable to track portions of the actor's body. Optionally, computer vision techniques may be used to identify specific feature of the actor's body (e.g., hands, arms, and so on). In some embodiments, an external object (e.g., a basketball) may have a marker on, or a sensor within, the object. Optionally, computer vision techniques may be used to analyze positions of the external object in the image or video data.

While the description above described use of an actor, in some embodiments video may be obtained of real-world events. For example, video from a real-world sports game may be obtained and analyzed. In this example, a particular player may be analyzed identify specific portions of the player's body. Example portions may include the player's hands, feet, head, and so on.

At block 224, the system extracts contact information for a bone. The system may identify contacts by the bone (e.g., a hand, foot, head, external object) with an external environment. For example, the motion capture information may reflect movement of an actor about a motion capture studio. In this example, the actor may perform complex combinations of movements for a threshold amount of time (e.g., one minute, five minutes, an hour, and so on). The actor may, as an example, represent a basketball player. For this example, the basketball player may perform movements including dribbling, passing, shooting, blocking, charging, and so on. As will be described, in some embodiments one or more other actors may be employed to function as opponents. Thus, the basketball player may perform movements to evade an opponent, shoot over an opponent, dunk on an opponent, and so on.

To extract contact information, the system obtains a frame of video or a particular image frame included in the motion capture information. In some embodiments, the frame may represent a particular time stamp associated with positions of bones of an actor's body. For example, certain motion capture studios or software may output positional information associated with markers for different time stamps.

The system then centers a window about the frame. For example, the window may represent a threshold number of frames (e.g., 60 frames) and may be centered on the frame. Thus, the window may include frames prior, and subsequent to, the frame. In some embodiments, the window size may be adjusted according to a frequency associated with a low pass filter applied to the contact information. As an example, the series window may be updated to reflect use of a threshold number of samples (e.g., 13 samples, with a cut-off of frequency for the filter of 3.25).

The contact information may be identified as a '1' for a contact of the bone with an external environment or optionally with the actor himself/herself. Similarly, the contact information may be identified as a '0' if there is no contact. Thus, for the samples identified above the system may generate a contact signal, an example of which is illustrated in FIG. 2C with respect to signal 260.

To identify a contact, in some embodiments the system may perform a collision check based on analyzing a frame. For example, the system may determine whether an actor's bone is within a threshold distance of a portion of an external object. In this example, the distance may be determined based on the motion capture information. For example, a position (e.g., a three-dimensional position) of the bone may be determined from the information. As another example, the position of the bone may be identified based on analyzing the frame. The system may then identify whether the bone contacted, or likely contacted, the external object.

The system may also determine a velocity difference between the bone and an external object. If the velocity difference is less than a threshold, and the bone is within a threshold distance of the external object, then the system may identify a contact with the external object.

At block 226, the system normalizes the contact information. The system may determine the mean and standard deviation of the contacts within the window identified in block 224. Based on the mean and standard deviation, the system normalizes the contact signal. An example of a normalized contact signal is illustrated in FIG. 2C with respect to signal 264. The system may then apply a low-pass filter, such as a Butterworth filter. An example of the resulting signal is illustrated in FIG. 2C, with respect to signal 266.

At block 228, the system extracts local bone phase associated with a sinusoidal function. The system may determine parameters associated with the sinusoidal function as fit to the contact signal. Example parameters include an amplitude, a maximum bone velocity, a phase offset, and a vertical offset. For example, the system may fit the following sinusoidal function for frame i centered in the window of N frames:

$$\Omega(F_i,t)=\alpha_i \sin(f_i*t-s_i)+b_i$$

Once the sinusoidal function is fit, the system can determine a 1-dimensional phase value:

$$\phi_i=(f_i*t-s_i) \bmod 2\pi$$

The system may use the above-described amplitude, along with a maximum bone velocity magnitude within a frequency-based frame window to generate local 2D phase vectors for the motion associated with frame i:

$$P_i = \|v_\Phi\| * a_i * \begin{pmatrix} \sin \phi_i \\ \cos \phi_i \end{pmatrix}$$

where the frequency-based frame window may be defined as:

$$\Phi = \frac{1}{\Delta \phi_i}$$

The 2D phase vector identified above may be assigned as the local bone phase for the bone for the frame. The system may similarly determine local bone phases for remaining bones for this frame.

An example of fitting the sinusoidal function is described below, however it may be appreciated that other techniques may be employed and fall within the scope of the disclosure. The system may infer Fi by minimizing a root mean squared error loss defined for the window of N frames. For fitting, a global probabilistic optimization (e.g., genetic algorithm and particle swarm optimization) may be combined with a local optimization technique (e.g., Broyden-Fletcher-Goldfarb-Shanno algorithm). Since the fitting problem may be performed for frame i, the number of parameters may be small and allow for quick convergence.

FIG. 2C illustrates example graphical representations of the process for determining local bone phase. As described above, a control signal 260 for a bone may be extracted from a window of N frames included in motion capture information. The N frames may be centered around a particular frame for which the local bone phase is to be associated.

The control signal 260 may be normalized, to generate a normalized signal 262. Subsequently, the normalized signal 262 may be provided to a low-pass filter to generate a filtered signal 264. A sinusoidal curve 266 may be fit to the filtered signal 262, and example parameters may be extracted. For example, an amplitude and phase may be extracted as illustrated in element 268. With respect to this element, the height of the bars illustrate the phase, the opacity illustrates the amplitude, and the slope of successive bars illustrates frequency.

Dynamic Animation Generation Process

Figure 3:
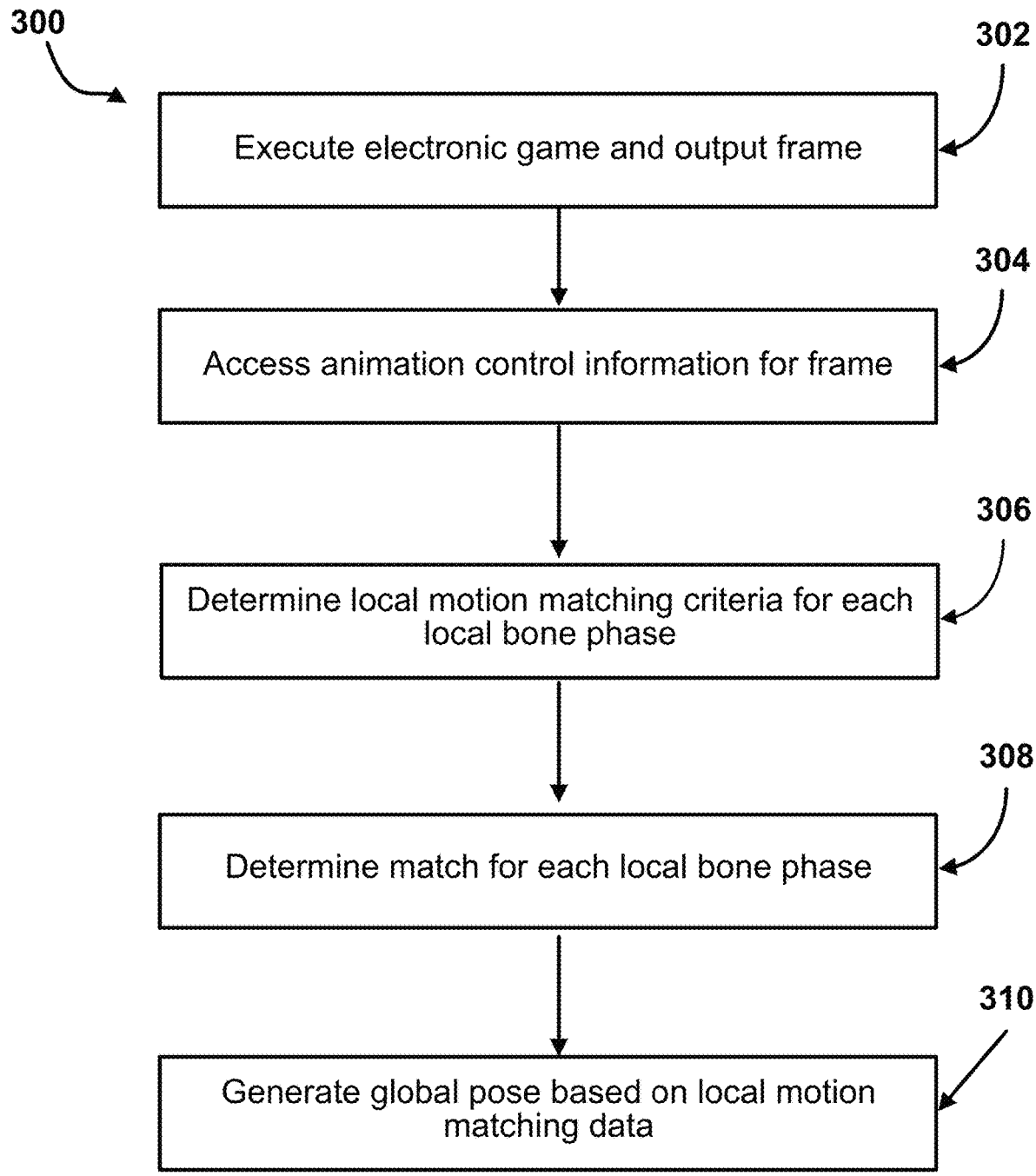
FIG. 3 is a flowchart of an example process for dynamically generating animation based on motion matching with local bone phases.

FIG. 3 is a flowchart of an example process 300 for dynamically generating animation using motion matching based on local bone phases. In some embodiments, the system may represent an electronic game console of one or more processors which is configured to execute electronic games. The dynamic animation generation system 100 may be used to autoregressively generate motion for an in-game character by implementing process 300. The dynamic animation generation system 100 may include different elements usable to generate the motion. For example, FIG. 1B includes a motion matching engine 120 and a pose generation system 130. The example process 300 can be implemented, at least in part, by the motion matching engine 120 and the pose generation system 130. The output of the motion matching engine 120 can be provided to the pose generation system 130. The output of the pose generation system 130 may be used to determine, at least, a character pose for a subsequent (e.g., next) frame. Thus, the in-game character may be rendered according to the character pose in the subsequent frame. For convenience, the process 300 will be described as being performed by a system of one or more computers (e.g., the dynamic animation generation system 100).

At block 302, the system executes an electronic game and outputs a frame. As described herein, the system may implement an animation system usable to update one or more in-game characters of an electronic game. For example, the animation system may cause character poses of the in-game characters to be updated such that animation may be generated.

In some embodiments the system may represent an application, or software, which is in communication with an electronic game. For example, an electronic game console may execute the electronic game and the application or software. In this example, the electronic game console may provide information during runtime of the executing game for use by the application or software. Example information may include a game state associated with the electronic game, which may be used by the application or software to generate or derive the animation control information described above. The application or software may therefore update character poses of one or more in-game characters and provide the updated character poses to the electronic game. In response, the electronic game may update the in-game characters accordingly.

In some embodiments, the system may represent a portion of an electronic game. For example, the motion matching engine 120 may be included in the electronic game (e.g., as a module). The motion generation model may then access the game state and cause updating of a pose of in-game characters.

At block 304, the system accesses animation control information for the frame. As described above, with respect to at least FIGS. 1A-1B, the system may autoregressively generate animation control information. Thus, the system may access animation control information which was generated for the output frame. The information may then be used to generate subsequent animation control information for a subsequent frame.

The animation control information may include local bone phases for bones of an in-game character being controlled by an end user and/or an external object. Example bones for the in-game character may include the hands, legs, head, and so on. An example external object may optionally represent an object with which the in-game character typically interacts. The external object may also represent an object which typically interacts with the in-game environment. In this way, the local bone phase(s) for the external object may provide an understanding of types of motion that the external object undergoes. With respect to a sports game, the object may represent a ball (e.g., a basketball). With respect to action games, the object may represent a sword, a bow, a wand, a hammer, and so on.

As described above, the local bone phases may be autoregressively generated by the system. For example, as the end user's in-game character traverses the in-game environment, information used to update the animation control information may be monitored. For example, FIG. 1B indicates that this information (e.g., information 119) may include contact information by the bones. As will be described in FIG. 4B, the system may use this information to update the animation control information for use in a subsequent frame. Thus, if the in-game character's leg (e.g., foot) comes into contact with an in-game environment, this contact may be used to update the local bone phase for this leg.

At block 306, the system, determines local motion matching criteria for each local bone phase. The animation system segments the motion matching process according to the local bone phases and determines the criteria used for performing each local motion matching process. The animation system can determine rules and weights for use with the present local motion match for the individual local bone phase. The rules and weights can be defined rules specific to different motion types in order to better match the local bone phase with the motion data. The animation system can provide the cost function and searching criteria for use in identifying matches during the search. The animation system can further define the search vector and segmentation of search data, such as segmenting search data based on motion type. The cost functions and matching criteria can vary based on motion type and local bone phase.

Generally, the matching criteria can be based on user input 114, character control variables 118, and the additional information 119. In some embodiments, for each local bone phase, the motion matching engine can perform a nearest neighbor search to identify the closest match.

At block 308, the motion matching engine determines a match for each local bone phases. During the matching process the animation system can identify the animation data closed to the local bone phase. The comparison can be between the 2D phase vector for the local bone phase and 2D phase vectors for the animation data. The 2D phase vector is representative of reference features of the local bone phase. The animation system can calculate a score based on the phase vector of the local bone phase and the corresponding phase vector of the potential start frame. The score may be calculated as a weighted average of the difference between each of the reference features of the current frame and the corresponding reference features of the potential start frame. For example, a difference between a location of foot for the current pose and the potential position of the pose of the animation data. Further, the weighted average may include differences between velocities of motion of the local bone phases as well as locations of local bone phases in three-dimensional space. Some reference features present in the vectors may be more important than other reference features and may be weighted differently in creating the weighted average. The acceleration or deceleration of movement of a local bone phase and/or the change in velocity of the local bone phase may be weighted differently based at least in part on the type motion. The search data can be segmented based on the motion type. For example, the search vector may only identify matches for motion data tagged with a specific motion type.

At block 310, after matches for bone level phases are complete, the animation system uses the matched animation data from each of the local motion matching phases to generate a global character pose. The animation system can blend the local bone phase matches with the character model to generate an updated character pose. The pose generation system 130 can use blending to reduce the occurrence of blurry, or otherwise unnatural, motions in order to adapt to different types of motions and tasks.

Thus, the animation system may substantially generate updated poses in real-time for each local bone phase. Since local bone phases are used, the animation system can quickly react to updates regarding types of motion and actions which are being performed by the end user's in-game character. As described above, the local bone phases may enhance realistic temporal alignment of character poses to form realistic animation of the end user's in-game character.

The animation system may additionally receive user input and/or character control information. For example, the animation system may use character control variables which inform, at least, trajectory information associated with the end user's in-game character. If the end user provided user input (e.g., within a threshold amount of time), the user input may be combined with the character control variables to inform motion of the character.

Using the above-described input information, the animation system may determine output information usable by the pose generation system 130 and to update the animation control information.

Additionally, to update the animation control information the system may access game state information. As described above, the animation control information may be generated for different frames which are centered on a threshold number of frames. For example, animation control information may be generated for a first frame of motion capture information which is centered on a threshold number of frames. Similarly, the system may use game state information when generating the output from the prediction network. Thus, if the in-game character interacted with an in-game environment, this interaction may be obtained by the system. Similarly, if an opponent moved this information may be appended as an input.

Figure 4:
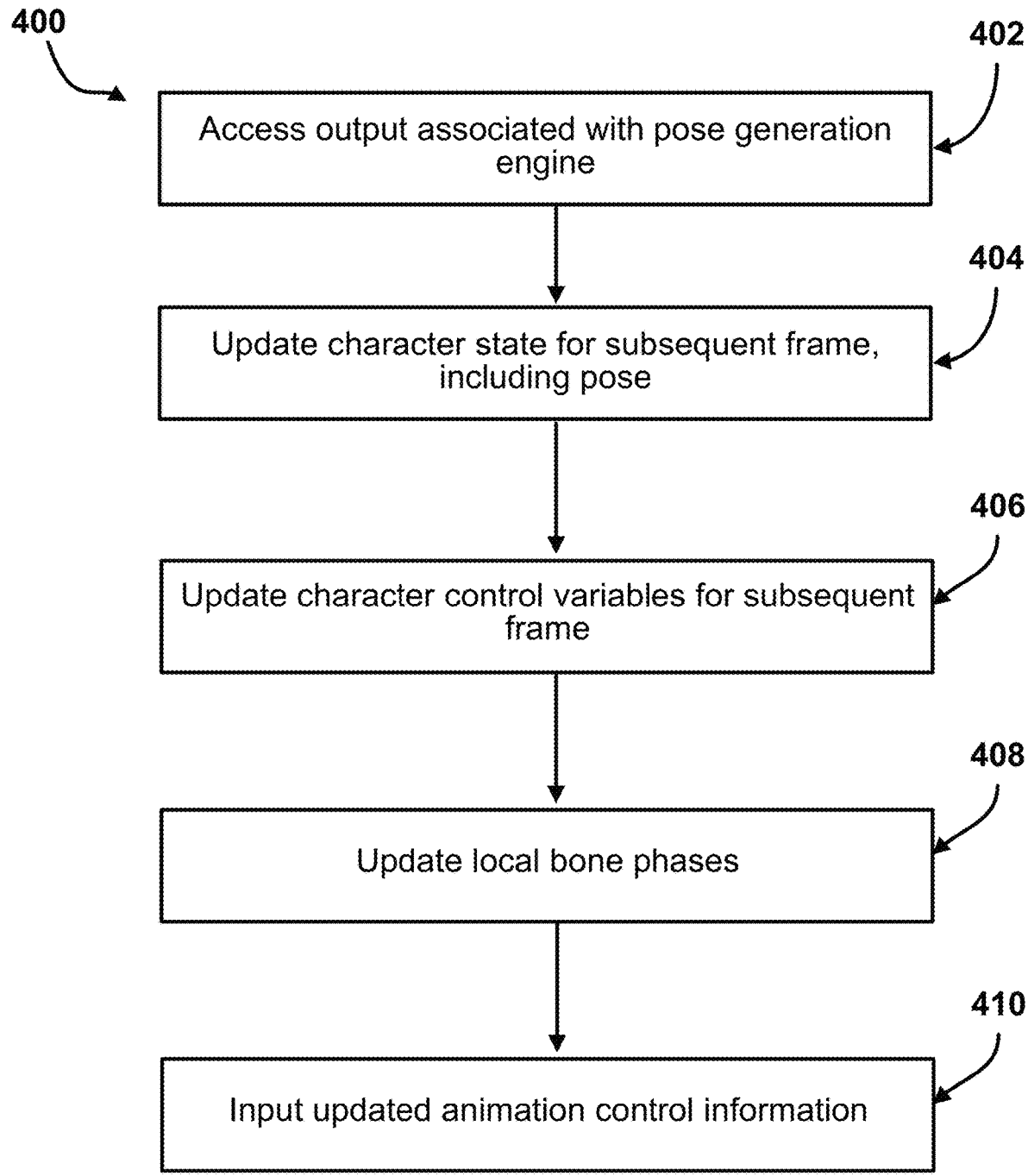
FIG. 4 is a flowchart of an example process for determining animation control information for a subsequent frame.

FIG. 4 is a flowchart of an example process 400 for determining animation control information for a subsequent frame. For convenience, the process 400 will be described as being performed by a system of one or more computers (e.g., the dynamic animation generation system 100). In some embodiments, the system may represent an electronic game console of one or more processors which is configured to execute electronic games.

At block 402, the system accesses local phase output associated with the animation system. The animation system generates output for use in updating animation control information for a subsequent frame.

At block 404, the system updates a character state for the subsequent frame. The output may indicate the character state for use in the subsequent frame, such as the character pose which an end user's in-game character is to assume.

At block 406, the system updates character control variables for the subsequent frame. As described in FIGS. 1A-1B, character control variables may be used to inform motion of the character. The character control variables in the output of the animation system may be combined with received user input. For example, the user input may represent the end user interacting with an electronic game controller. As may be appreciated, these interactions may occur slower than an output frame rate of the electronic game. Thus, the user input may be combined with the character control variables for any frame in which the end user is interacting with the controller. The user input may also be aggregated over a threshold number of prior frames and used to update the character control variables every threshold number of frames (e.g., every 5 frames).

Since the user input is provided in the form of course, high-level controls, the system may convert the user input into a similar form as the character control variables. For example, if the end user is holding down a control stick to move forward, then the system may generate trajectory information indicating that the in-game character is to move forward. As another example, if the end user interacts with a button to cause shooting of a ball, then the system may generate trajectory information indicating this type of motion.

An example technique to update the character control variables may include applying use of weighting to the output character control variables and user input. An example weighting may be based on time. For example, the character control variables may include information associated with a window of time. In this example, the variables may store information for a prior threshold number of frames along with a current frame. Thus, the information for earlier of the frames may be weighted less than the information for later of the frames.

At block 408, the system updates the local bone phases. The system accesses the local bone phases included in the output from the animation system. In some embodiments, the system may update the local bone phases via interpolation with the previous local bone phases (e.g., the local bone phase accessed in FIG. 4A). This interpolation may ensure that local bone phases are maintained in a well-defined manifold.

At block 410, the system inputs updated animation control information. The updated animation control information may therefore represent the output of the animation system, optionally with modifications as described above. This updated information may then be provided as an input to the system, such that motion for the in-game character may be autoregressively updated.

Example Computing System

Figure 5:
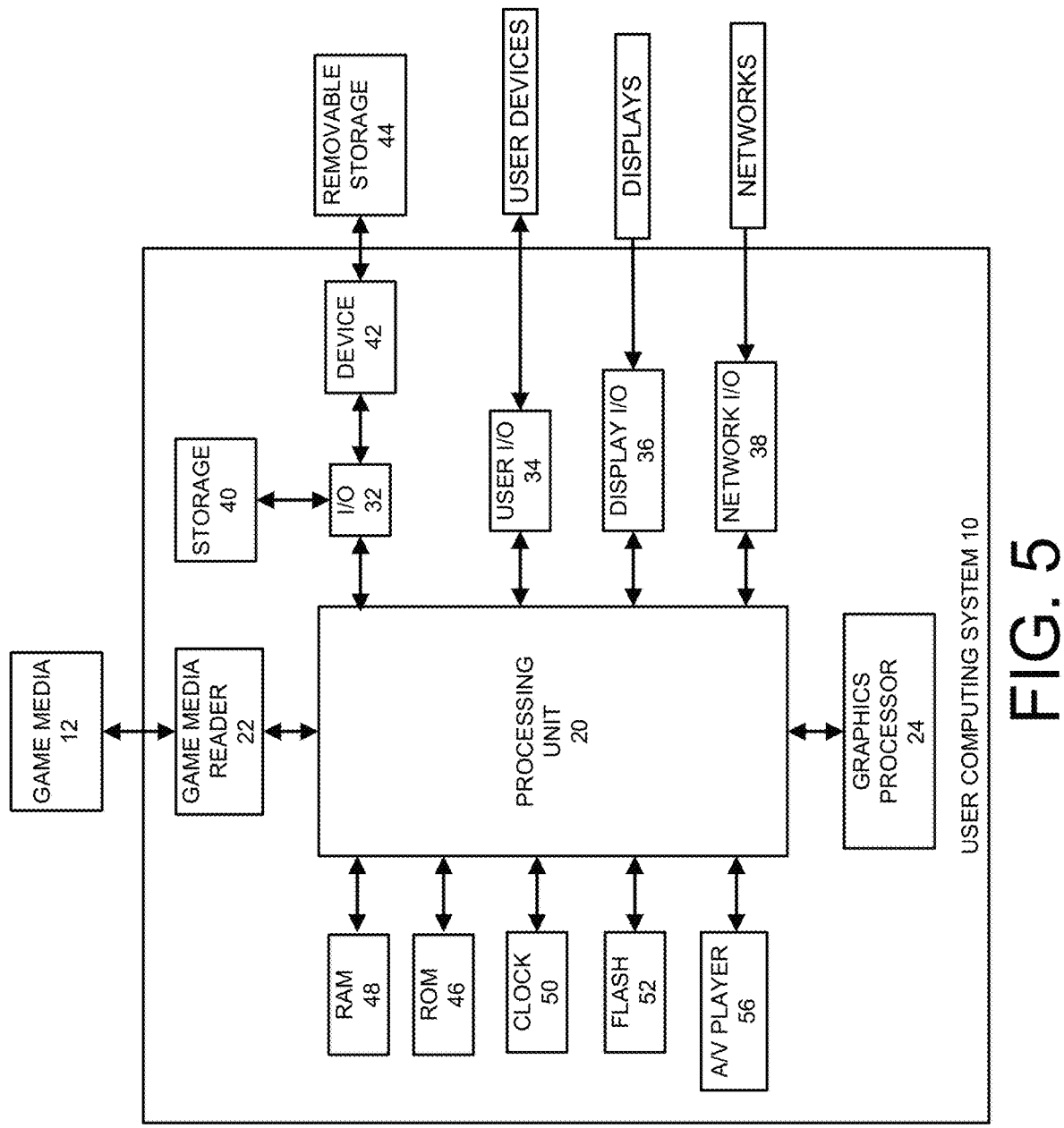
FIG. 5 illustrates an embodiment of computing device according to the present disclosure.

FIG. 5 illustrates an embodiment of computing device 10 according to the present disclosure. Other variations of the computing device 10 may be substituted for the examples explicitly presented herein, such as removing or adding components to the computing device 100. The computing device 10 may include a game device, a smart phone, a tablet, a personal computer, a laptop, a smart television, a car console display, a server, and the like. As shown, the computing device 10 includes a processing unit 20 that interacts with other components of the computing device 10 and also external components to computing device 10. A media reader 22 is included that communicates with media 12. The media reader 22 may be an optical disc reader capable of reading optical discs, such as CD-ROM or DVDs, or any other type of reader that can receive and read data from game media 12. One or more of the computing devices may be used to implement one or more of the systems disclosed herein.

Computing device 10 may include a separate graphics processor 24. In some cases, the graphics processor 24 may be built into the processing unit 20. In some such cases, the graphics processor 24 may share Random Access Memory (RAM) with the processing unit 20. Alternatively, or in addition, the computing device 10 may include a discrete graphics processor 24 that is separate from the processing unit 20. In some such cases, the graphics processor 24 may have separate RAM from the processing unit 20. Computing device 10 might be a handheld video game device, a dedicated game console computing system, a general-purpose laptop or desktop computer, a smart phone, a tablet, a car console, or other suitable system.

Computing device 10 also includes various components for enabling input/output, such as an I/O 32, a user I/O 34, a display I/O 36, and a network I/O 38. I/O 32 interacts with storage element 40 and, through a device 42, removable storage media 44 in order to provide storage for computing device 10. Processing unit 20 can communicate through I/O 32 to store data, such as game state data and any shared data files. In addition to storage 40 and removable storage media 44, computing device 10 is also shown including ROM (Read-Only Memory) 46 and RAM 48. RAM 48 may be used for data that is accessed frequently, such as when a game is being played or the fraud detection is performed.

User I/O 34 is used to send and receive commands between processing unit 20 and user devices, such as game controllers. In some embodiments, the user I/O can include a touchscreen inputs. The touchscreen can be capacitive touchscreen, a resistive touchscreen, or other type of touchscreen technology that is configured to receive user input through tactile inputs from the user. Display I/O 36 provides input/output functions that are used to display images from the game being played. Network I/O 38 is used for input/output functions for a network. Network I/O 38 may be used during execution of a game, such as when a game is being played online or being accessed online and/or application of fraud detection, and/or generation of a fraud detection model.

Display output signals produced by display I/O 36 comprising signals for displaying visual content produced by computing device 10 on a display device, such as graphics, user interfaces, video, and/or other visual content. Computing device 10 may comprise one or more integrated displays configured to receive display output signals produced by display I/O 36. According to some embodiments, display output signals produced by display I/O 36 may also be output to one or more display devices external to computing device 10, such a display 16.

The computing device 10 can also include other features that may be used with a game, such as a clock 50, flash memory 52, and other components. An audio/video player 56 might also be used to play a video sequence, such as a movie. It should be understood that other components may be provided in computing device 10 and that a person skilled in the art will appreciate other variations of computing device 10.

Program code can be stored in ROM 46, RAM 48 or storage 40 (which might comprise hard disk, other magnetic storage, optical storage, other non-volatile storage or a combination or variation of these). Part of the program code can be stored in ROM that is programmable (ROM, PROM, EPROM, EEPROM, and so forth), part of the program code can be stored in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the execution of an application and portions thereof might also be reserved for frame buffers, application state information, and/or other data needed or usable for interpreting user input and generating display outputs. Generally, RAM 48 is volatile storage and data stored within RAM 48 may be lost when the computing device 10 is turned off or loses power.

As computing device 10 reads media 12 and provides an application, information may be read from game media 12 and stored in a memory device, such as RAM 48. Additionally, data from storage 40, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as media 12 and storage 40.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated, via software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence or can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer-implemented method comprising:
  as implemented by a computing system having at least one processor configured with specific computer-executable instructions,
    accessing first animation control information generated by a for a first frame of an electronic game, the first animation control information including a first character pose of an in-game character and, at least, a plurality of local bone phases associated with an in-game character of the electronic game, individual local bone phases representing phase information associated with contacts of at least one rigid bodies of the in-game character with an in-game environment;

matching a local bone phase to local pose animation data for the corresponding local bone phase, wherein the local bone phase is encoded with local bone phase characteristics including position, orientation, velocity, and acceleration;

generating a second character pose of the character model based on at least the matched local pose animation data for a second frame of the electronic game; and rendering the second frame including at least a portion of the second character pose of the character model within the in-game environment.

2. The computer-implemented method of claim 1, wherein the local bone phase is represented by a two dimensional vector encoded with the local bone phase characteristics of the local bone phase.

3. The computer-implemented method of claim 2, further comprising selecting a local pose from a plurality of eligible local poses corresponding to the local bone phase, by performing a nearest neighbor search using the two dimensional vector of the local bone phase as compared to two dimensional vectors of local poses in the animation data.

4. The computer-implemented method of claim 1 further comprising identifying a motion type associated with the second pose of the in-game character.

5. The computer-implemented method of claim 4 further comprising identifying a subset of the animation data corresponding to the motion type.

6. The computer-implemented method of claim 1, wherein generating the second pose of the character model comprises blending the plurality of local poses with a global pose to generate the second pose.

7. The computer-implemented method of claim 1, wherein the first animation control information comprises information aggregated over a prior threshold number of frames.

8. The computer-implemented method of claim 1, wherein the local bone phases further represent phase information associated with an external object configured to be interacted with by the in-game character.

9. The computer-implemented method of claim 1 further comprising computing second animation control information for the second frame, wherein the second animation control information includes updated local bone phases, and wherein the updated local bone phases are determined via interpolation of the local bone phases included in the first animation control information.

10. A system comprising one or more processors and non-transitory computer storage media storing computer-readable instructions that when executed by the one or more processors, cause the one or more processors to perform operations comprising:

accessing first animation control information generated by a for a first frame of an electronic game, the first animation control information including a first character pose of an in-game character and, at least, a plurality of local bone phases associated with an in-game character of the electronic game, individual local bone phases representing phase information associated with contacts of at least one rigid bodies of the in-game character with an in-game environment;

matching the local bone phase to local pose animation data for the corresponding local bone phase, wherein the local bone phase is encoded with local bone phase characteristics including position, orientation, velocity, and acceleration; and generating a second character pose of the character model based on at least the matched local pose animation data for a second frame of the electronic game;

rendering the second frame including at least a portion of the second character pose of the character model within the in-game environment.

11. The system of claim 10, wherein the local bone phase is represented by a two dimensional vector encoded with the local bone phase characteristics of the local bone phase.

12. The system of claim 11, wherein the computer-readable instructions further configure the one or more processors to select a local pose from a plurality of eligible local poses corresponding to the local bone phase by performing a nearest neighbor search using the two dimensional vector of the local bone phase as compared to two dimensional vectors of local poses in the animation data.

13. The system of claim 10, wherein the computer-readable instructions further configure the one or more processors to identify a motion type associated with the second pose of the in-game character.

14. The system of claim 13, wherein the computer-readable instructions further configure the one or more processors to identify a subset of the animation data corresponding to the motion type.

15. The system of claim 10, wherein the computer-readable instructions further configure the one or more processors to blend the plurality of local poses with a global pose to generate the second pose when generating the second pose of the character model.

16. The system of claim 10, wherein the first animation control information comprises information aggregated over a prior threshold number of frames.

17. The system of claim 10, wherein the local bone phases further represent phase information associated with an external object configured to be interacted with by the in-game character.

18. The system of claim 10, wherein the computer-readable instructions further configure the one or more processors to compute second animation control information for the second frame, wherein the second animation control information includes updated local bone phases, and wherein the updated local bone phases are determined via interpolation of the local bone phases included in the first animation control information.

* * * * *